(12) United States Patent
Ikehashi et al.

(10) Patent No.: US 8,138,655 B2
(45) Date of Patent: Mar. 20, 2012

(54) ELECTROSTATIC ACTUATOR WITH ELECTRODES HAVING VARYING DISTANCES AT DIFFERENT PORTIONS

(75) Inventors: Tamio Ikehashi, Yokohama (JP); Hiroaki Yamazaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 390 days.

(21) Appl. No.: 12/109,071

(22) Filed: Apr. 24, 2008

(65) Prior Publication Data
US 2008/0265710 A1 Oct. 30, 2008

(30) Foreign Application Priority Data

Apr. 27, 2007 (JP) ................................. 2007-119336

(51) Int. Cl.
*H01H 49/00* (2006.01)
*H01H 59/00* (2006.01)
*H02N 1/00* (2006.01)
*H01G 5/18* (2006.01)

(52) U.S. Cl. ......... 310/309; 361/278; 200/181; 333/262

(58) Field of Classification Search .................. 310/309; 333/362; 361/277, 278; 200/181
See application file for complete search history.

(56) References Cited

U.S. PATENT DOCUMENTS

| | | | | | |
|---|---|---|---|---|---|
| 5,479,042 | A | * | 12/1995 | James et al. | 257/415 |
| 5,638,946 | A | * | 6/1997 | Zavracky | 200/181 |
| 5,677,823 | A | * | 10/1997 | Smith | 361/234 |
| 6,483,395 | B2 | | 11/2002 | Kasai et al. | |
| 7,141,989 | B1 | * | 11/2006 | Liu | 324/661 |
| 7,145,284 | B2 | | 12/2006 | Ikehashi | |
| 7,177,134 | B2 | | 2/2007 | Ikehashi et al. | |
| 7,230,513 | B2 | * | 6/2007 | Chou | 333/262 |
| 7,382,218 | B2 | * | 6/2008 | Charvet | 335/78 |
| 2002/0027487 | A1 | * | 3/2002 | Suzuki | 333/262 |
| 2006/0098059 | A1 | | 5/2006 | Ohguru et al. | |
| 2006/0119227 | A1 | | 6/2006 | Ikehashi | |
| 2006/0226735 | A1 | | 10/2006 | Ikehashi | |
| 2007/0138608 | A1 | | 6/2007 | Ikehashi | |
| 2007/0262400 | A1 | | 11/2007 | Ikehashi | |
| 2008/0265710 | A1 | * | 10/2008 | Ikehashi et al. | 310/309 |

FOREIGN PATENT DOCUMENTS

| | | | | |
|---|---|---|---|---|
| JP | 2000-214397 | * | 8/2000 | |
| JP | 2006-238265 | * | 9/2006 | |
| WO | 2004/064096 | * | 7/2004 | |

OTHER PUBLICATIONS

Machine translation of "Vibrator Structure and Manufacturing Method Thereof", JP 2006-238265, Sep. 7, 2006, Watanabe et al.*
Gabriel M. Rebeiz, "RF MEMS: Theory, Design, and Technology", Wiley-Interscience, Jun. 15, 2002, pp. 130-139.

* cited by examiner

*Primary Examiner* — Karl Tamai
(74) *Attorney, Agent, or Firm* — Oblon, Spivak, McClelland, Maier & Neustadt, L.L.P.

(57) ABSTRACT

An electrostatic actuator includes first and second lower electrodes formed apart from each other above a substrate, an electrode portion formed above the first and second lower electrodes and first and second upper electrodes, a distance between the first upper electrode and the first lower electrode at a first portion being greater than that at a second portion, a distance between the second upper electrode and the second lower electrode at a third portion being greater than that at a fourth portion, a first boundary portion between the first and third upper electrodes having a convex shape, a second boundary portion between the second and third upper electrodes having a convex shape, and the electrode portion driving the third upper electrode, and first and second layers formed in the first and second boundary portions.

20 Claims, 24 Drawing Sheets

Cross section of A-A'

Cross section of A-A'

Cross section of B-B'

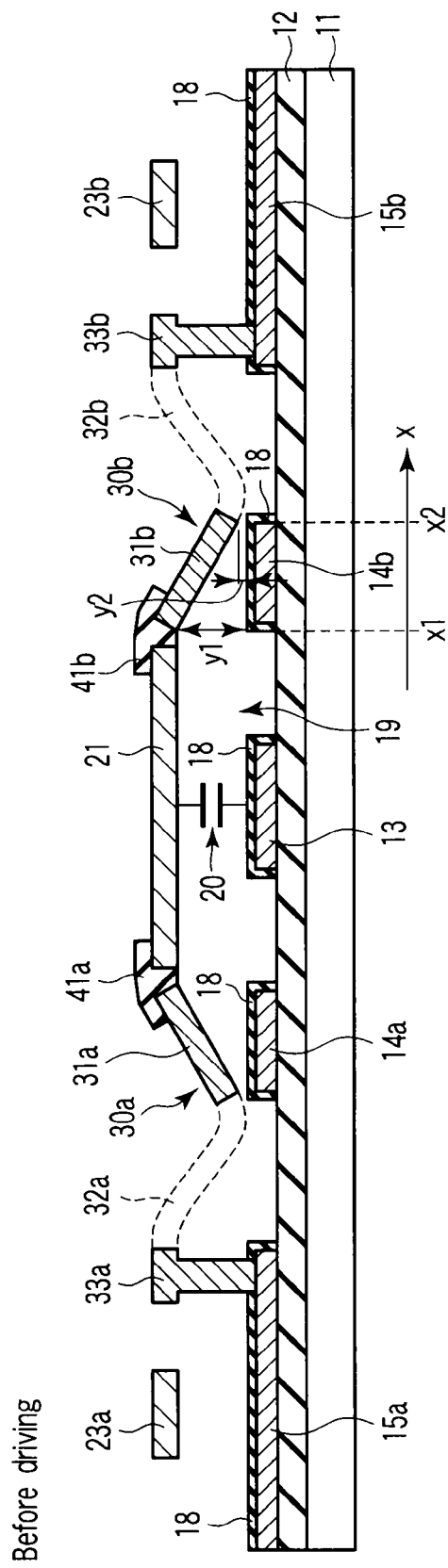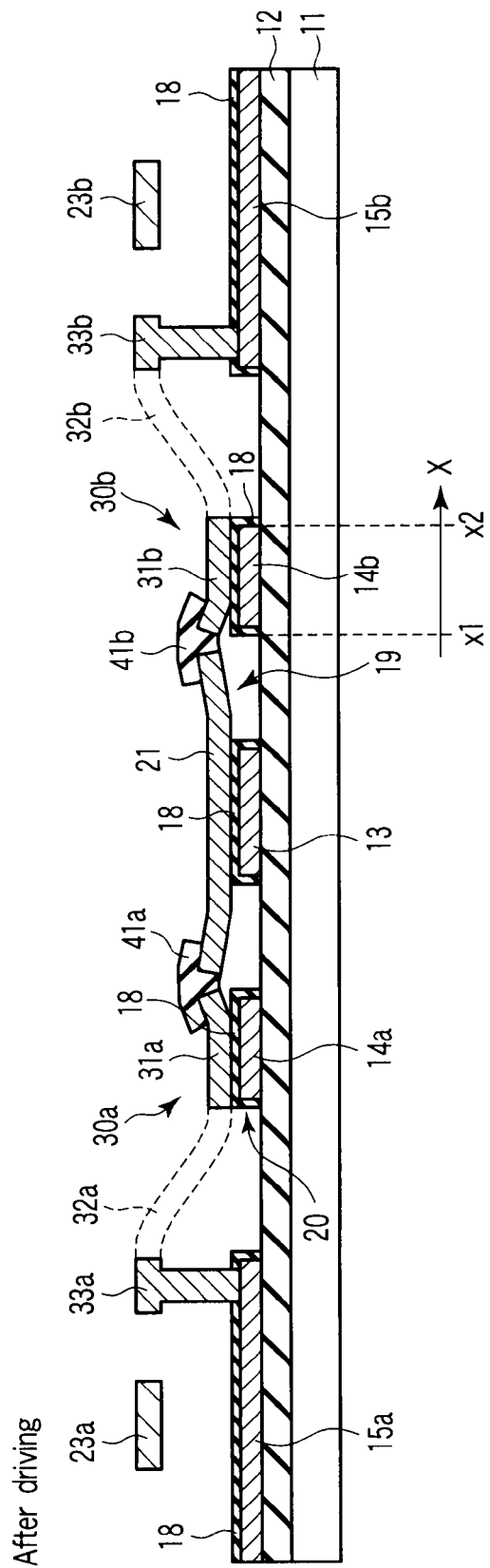

Cross section of C-C'

Cross section of C-C'

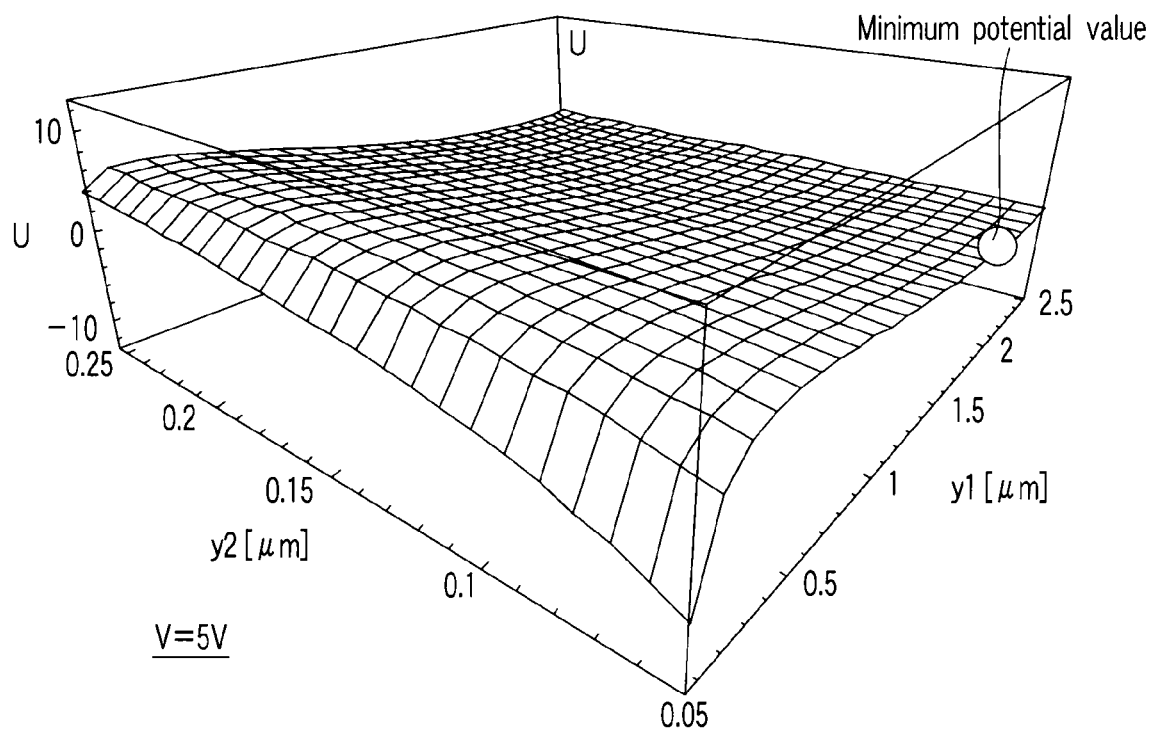
F I G. 11C
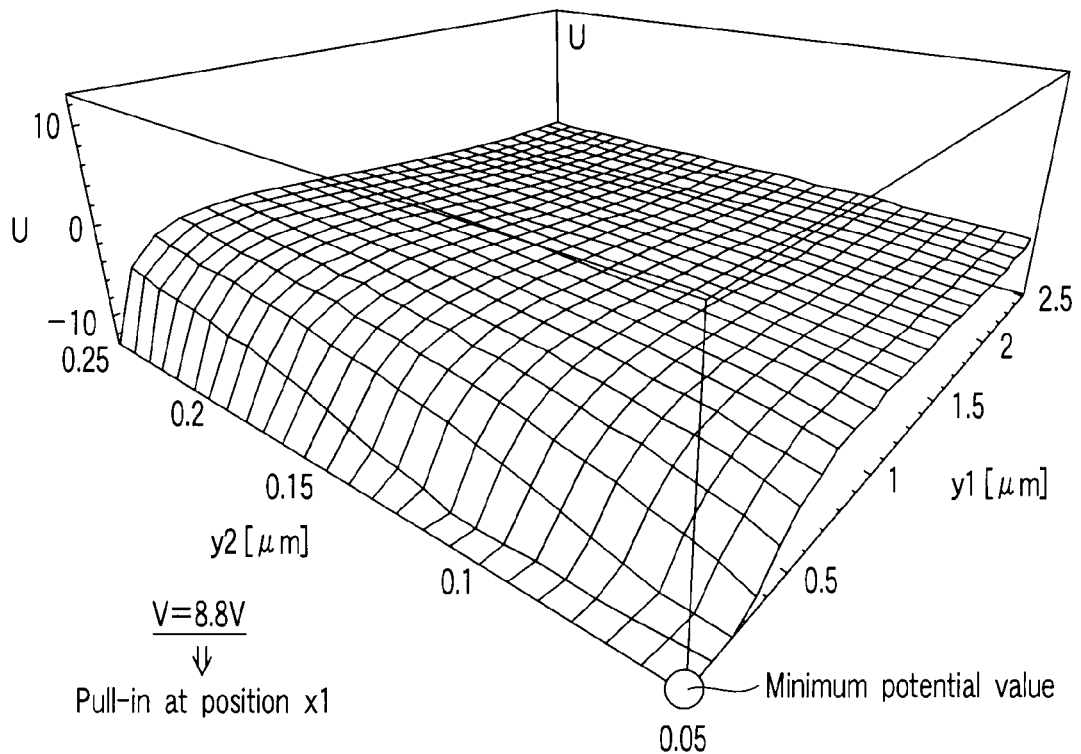
F I G. 11D

Cross section of A-A'

Cross section of B-B'

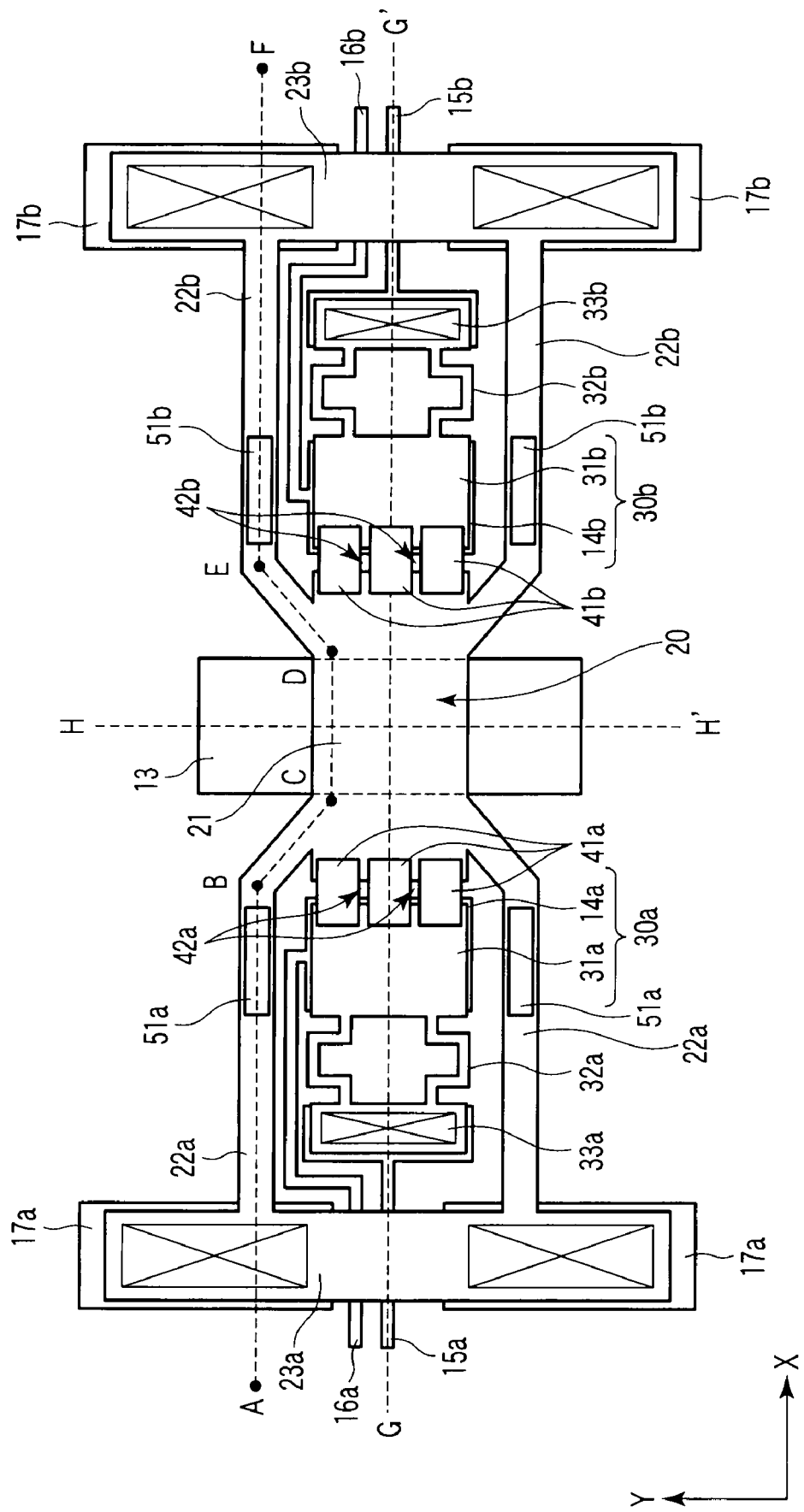
F I G. 18

Cross section of A-B-C-D-E-F

Cross section of G-G'

Cross section of H-H'

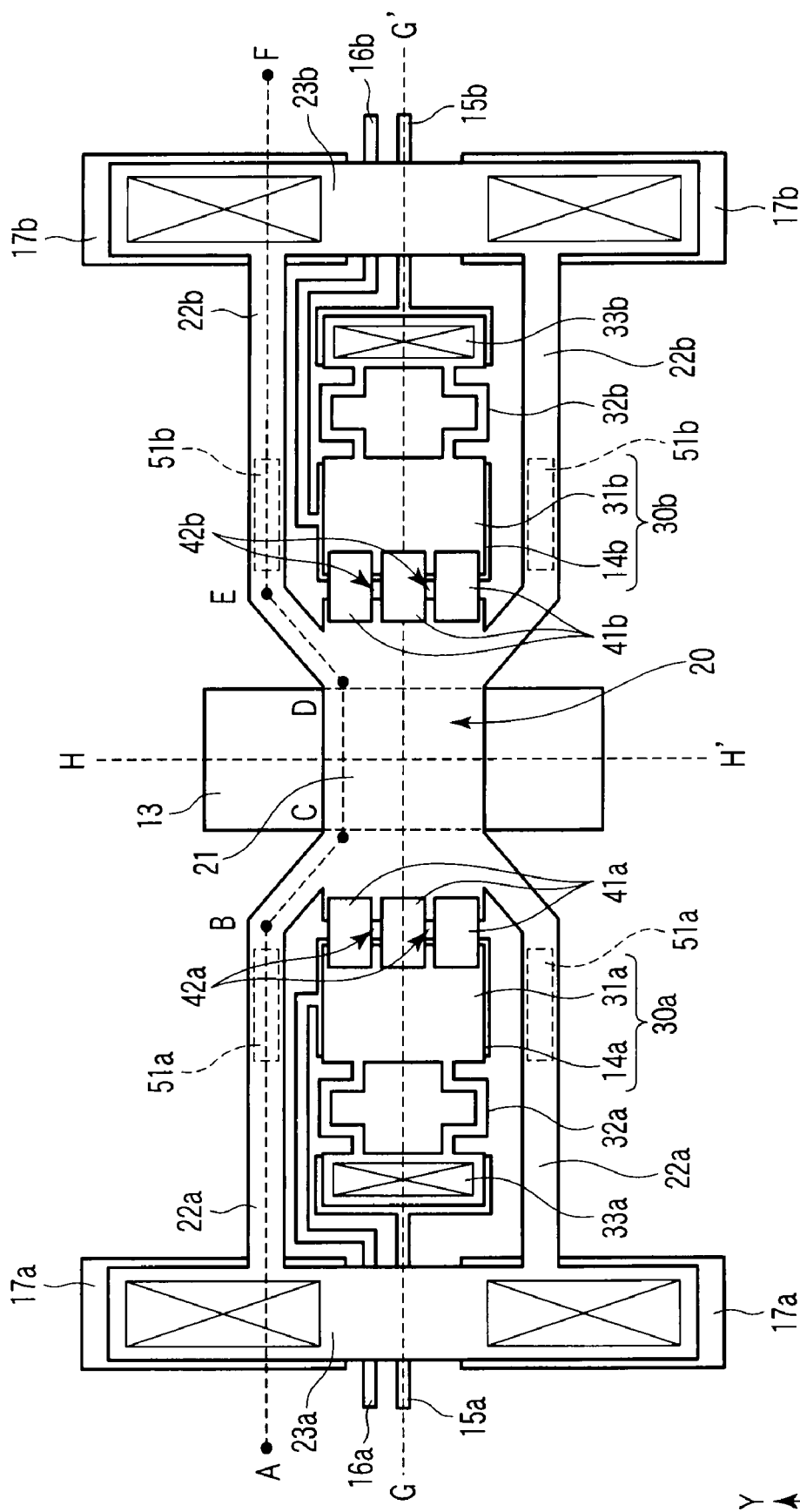
F I G. 22

Cross section of A-B-C-D-E-F

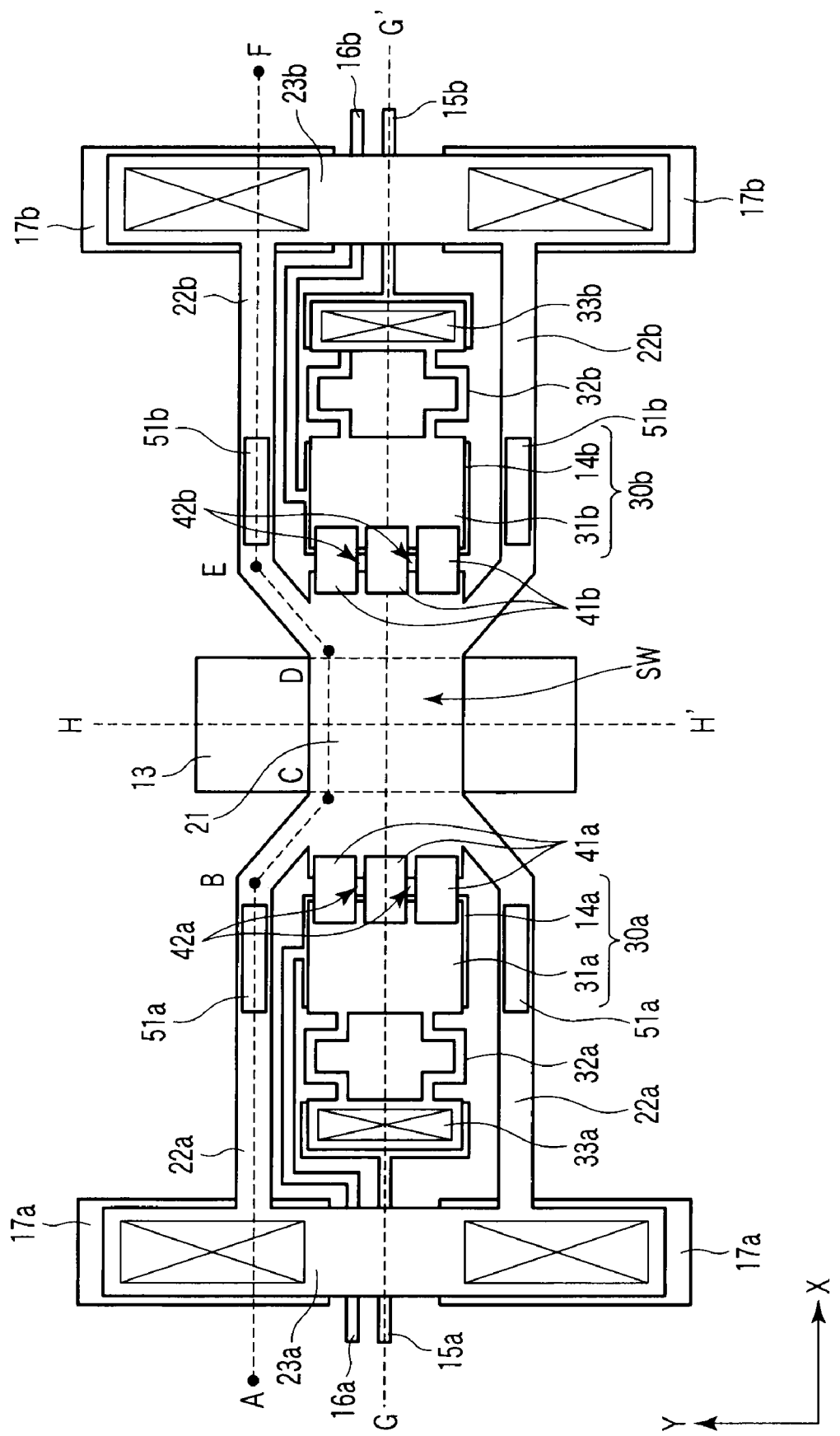
F I G. 26

Cross section of A-B-C-D-E-F

Cross section of G-G'

Cross section of H-H'
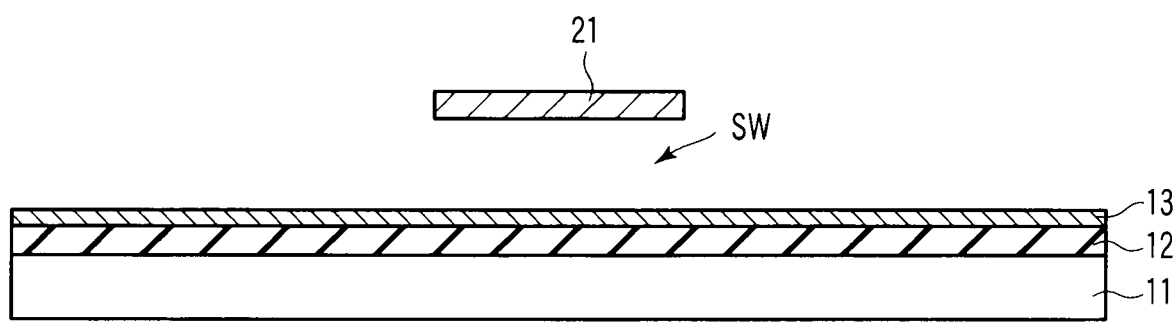
F I G. 29

US 8,138,655 B2

ELECTROSTATIC ACTUATOR WITH ELECTRODES HAVING VARYING DISTANCES AT DIFFERENT PORTIONS

CROSS-REFERENCE TO RELATED APPLICATIONS

This application is based upon and claims the benefit of priority from prior Japanese Patent Application No. 2007-119336, filed Apr. 27, 2007, the entire contents of which are incorporated herein by reference.

BACKGROUND OF THE INVENTION

1. Field of the Invention

The present invention relates to an electrostatic actuator formed by using the micromachine or MEMS (Micro-Electro-Mechanical Systems) technique and, more particularly, to a switch, variable capacitor, or the like using the electrostatic actuator.

2. Description of the Related Art

A MEMS switch using an electrostatic actuator is disclosed in, e.g., U.S. Pat. No. 6,483,395 or MEMS SWITCH LIBRARY pp. 130-139. To turn on the MEMS switch, a potential difference is applied between upper and lower electrodes of the electrostatic actuator so that the electrostatic attraction between the upper and lower electrodes exceeds the spring force of a beam.

The driving voltage of this electrostatically driven MEMS switch is as high as 20V or more. A charge pump is necessary because this driving voltage is higher than the power supply voltage of a portable terminal system. The charge pump is disadvantageous for a portable system because the circuit has a large chip area and high power consumption. In addition, noise generated by the charge pump may cause an operation error of a wireless circuit.

The driving voltage can be lowered by decreasing the spring constant of the electrostatic actuator. However, a low driving voltage weakens the force that brings the upper and lower electrodes into contact with each other, i.e., the contact force. As a consequence, the contact resistance of the switch increases. Also, if the spring constant is small, the separation force weakens. This readily causes a failure by which the upper and lower electrodes are not separated but kept in contact with each other, i.e., a so-called stiction failure.

The above-mentioned problems of the MEMS switch similarly exist in a MEMS variable capacitor. That is, if the spring constant is decreased in order to lower the driving voltage, the contact force weakens, so no high capacitance ratio can be obtained any longer. Also, a stiction failure readily occurs as in the switch.

BRIEF SUMMARY OF THE INVENTION

An electrostatic actuator according to an aspect of the present invention comprising: a substrate; a first lower electrode and a second lower electrode formed apart from each other above the substrate; an electrode portion formed above the first lower electrode and the second lower electrode to have a cavity portion, including a first upper electrode, a second upper electrode, and a third upper electrode formed between the first upper electrode and the second upper electrode, the first upper electrode opposing the first lower electrode and having a first portion and a second portion, a first distance between the first upper electrode and the first lower electrode at the first portion being greater than a second distance between the first upper electrode and the first lower electrode at the second portion, the second upper electrode opposing the second lower electrode and having a third portion and a fourth portion, a third distance between the second upper electrode and the second lower electrode at the third portion being greater than a fourth distance between the second upper electrode and the second lower electrode at the fourth portion, a first boundary portion between the first upper electrode and the third upper electrode having a convex shape, a second boundary portion between the second upper electrode and the third upper electrode having a convex shape, and the electrode portion driving the third upper electrode by applying a potential difference between the first lower electrode and the first upper electrode and between the second lower electrode and the second upper electrode; and a first layer and a second layer formed in the first boundary portion and the second boundary portion, respectively.

BRIEF DESCRIPTION OF THE SEVERAL VIEWS OF THE DRAWING

FIG. 4 is a sectional view showing the state before the electrostatic actuator according to the first embodiment is driven;

FIG. 5 is a sectional view showing the state after the electrostatic actuator according to the first embodiment is driven;

FIG. 11C is a view showing a potential shape when the potential difference between the electrodes of the actuator portion according to the first embodiment is 5V;

FIG. 11D is a view showing a potential shape when the potential difference between the electrodes of the actuator portion according to the first embodiment is 8.8V;

FIG. 18 is a top view of an electrostatic actuator according to the fourth embodiment;

FIG. 22 is a top view of an electrostatic actuator according to the fourth embodiment;

FIG. 26 is a top view of an electrostatic actuator according to the fifth embodiment;

FIG. 29 is a sectional view taken along a line H-H' in FIG. 26.

DETAILED DESCRIPTION OF THE INVENTION

Figure 1:
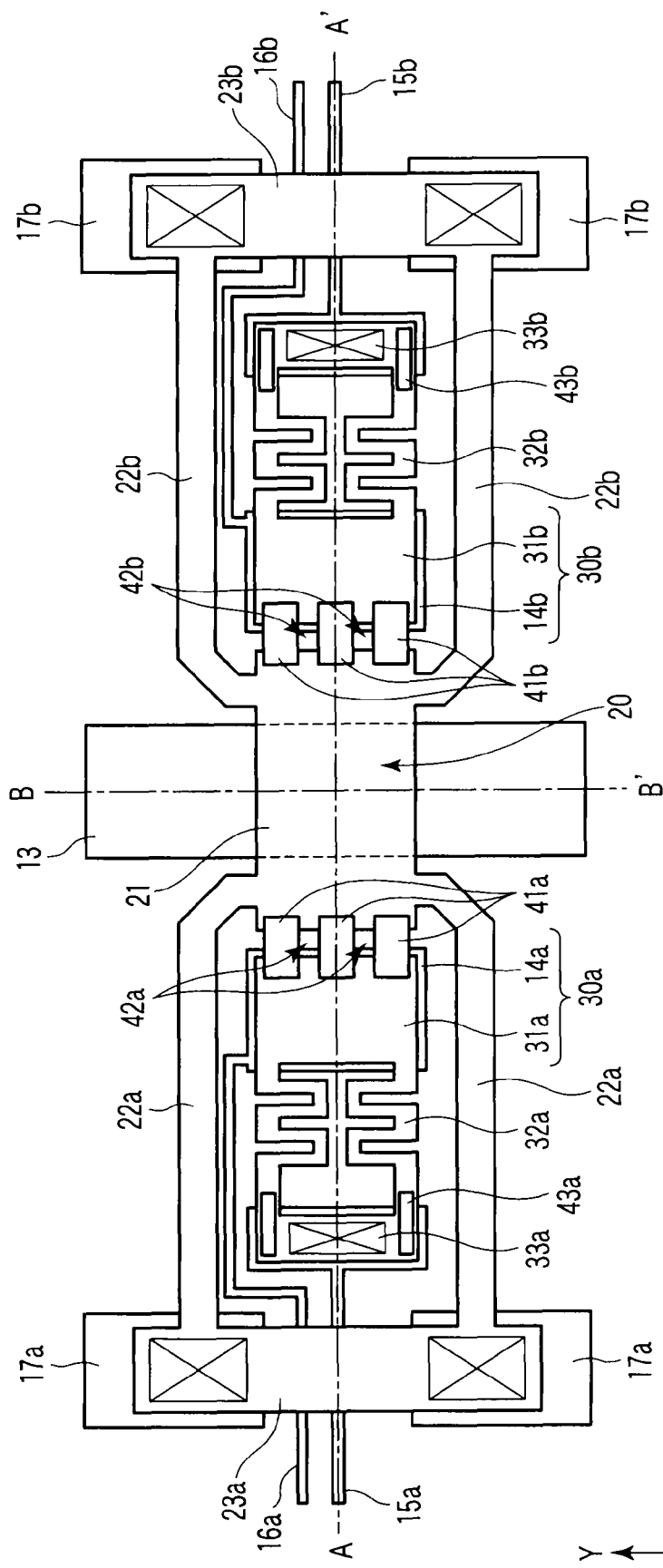
FIG. 1 is a top view of an electrostatic actuator according to the first embodiment.

Embodiments of the present invention will be explained below with reference to the accompanying drawing. In the following explanation, the same reference numerals denote the same parts throughout the drawing.

[1] First Embodiment

The first embodiment is an example in which an electrostatic actuator is applied to a variable capacitor.
[1-1] Structure of Electrostatic Actuator
(Planar Structure)

FIG. 1 is a top view of the electrostatic actuator according to the first embodiment. The planar structure of the electrostatic actuator will be explained below.

As shown in FIG. 1, a signal line 13 runs in the Y direction. An electrode 21 to be vertically driven is formed above the signal line 13 so as to oppose it.

The electrode 21 extends in a direction perpendicular to the direction in which the signal line 13 runs, i.e., in the X direction.

Beams 22a and 22b are connected to the two ends of the electrode 21 in the X direction. The beams 22a and 22b extend in the X direction. Anchors 23a and 23b are respectively connected to the beams 22a and 22b. For example, the beam 22a on the left side of the drawing surface branches into two portions from one end portion of the electrode 21, and these two portions connect to the anchor 23a. The beam 22b on the right side of the drawing surface branches into two portions from the other end portion of the electrode 21, and these two portions connect to the anchor 23b. The anchors 23a and 23b are respectively connected to ground lines 17a and 17b.

Actuator portions 30a and 30b having a bridge structure are formed on the two sides of the electrode 21 in the X direction. The actuator portion 30a has an upper electrode 31a and lower electrode 14a. The actuator portion 30b has an upper electrode 31b and lower electrode 14b.

Spring structure portions 32a and 32b are respectively connected to the upper electrodes 31a and 31b. The planar shape of the spring structure portions 32a and 32b is a meander shape. In this embodiment, the thickness of lines forming the beams 22a and 22b is larger than that of lines forming the spring structure portions 32a and 32b. Anchors 33a and 33b are respectively connected to the spring structure portions 32a and 32b. Lines 15a and 15b are respectively connected to the anchors 33a and 33b.

The lower electrodes 14a and 14b are formed below the upper electrodes 31a and 31b so as to oppose the upper electrodes 31a and 31b, respectively. The lower electrodes 14a and 14b are respectively connected to lines 16a and 16b.

The upper electrode 31a, spring structure portion 32a, anchor 33a, and lower electrode 14a are positioned between the two branched portions of the beam 22a. The upper electrode 31b, spring structure portion 32b, anchor 33b, and lower electrode 14b are positioned between the two branched portions of the beam 22b. The lines 15a and 16a are extracted outside the anchor 23a. The lines 15b and 16b are extracted outside the anchor 23b.

The electrode 21 is spaced apart from the upper electrodes 31a and 31b. An insulating layer 41a formed in the boundary between the electrode 21 and upper electrode 31a connects them. Similarly, an insulating layer 41b formed in the boundary between the electrode 21 and upper electrode 31b connects them. The insulating layer 41b connects the electrode 21 and the upper electrode 31b. The insulating layers 41a and 41b have a stress different from those of the electrode 21 and upper electrodes 31a and 31b. The insulating layers 41a and 41b are formed to connect to only those sides of the upper electrodes 31a and 31b adjacent to the electrode 21. Slits 42a and 42b are respectively formed in the insulating layers 41a and 41b in a direction almost perpendicular to the above-mentioned sides. Each of the slits 42a and 42b separates a corresponding one of the insulating layers 41a and 41b into a plurality of (in this embodiment, three) islands.
(A-A' Sectional Structure)

Figure 2:
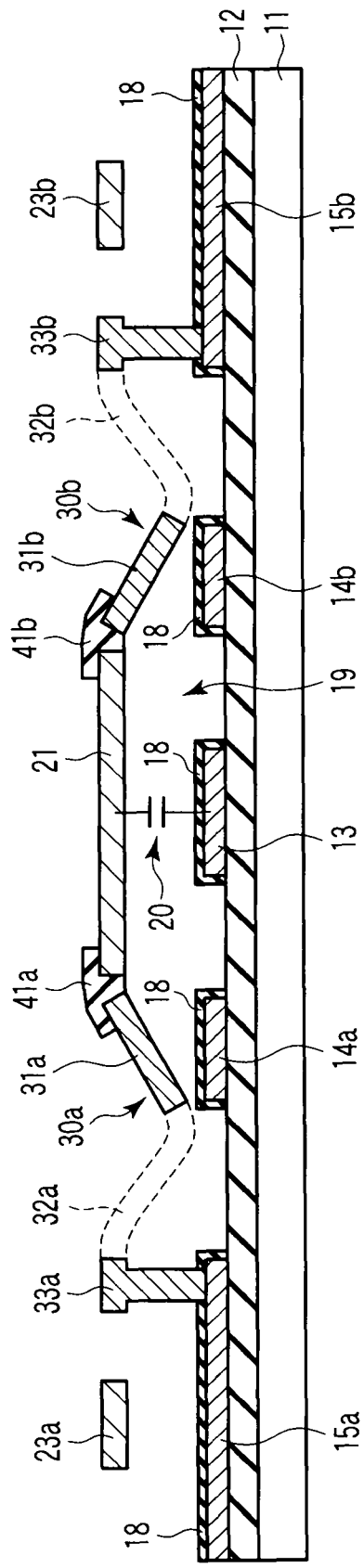
FIG. 2 is a sectional view taken along a line A-A' in FIG. 1.

FIG. 2 is a sectional view taken along a line A-A' in FIG. 1. The A-A' sectional structure of the electrostatic actuator will be explained below.

As shown in FIG. 2, an insulating film 12 made of, e.g., a thermal oxide film is formed on a substrate 11 such as a silicon substrate or glass substrate. The signal line 13, lower electrodes 14a and 14b, and lines 15a and 15b are arranged on the insulating film 12. Note that the lines 16a and 16b and ground lines 17a and 17b shown in FIG. 1 are also arranged on the insulating film 12, although they do not exist in this section. The lower electrodes 14a and 14b are arranged on the two sides of the signal line 13. The signal line 13, lower electrodes 14a and 14b, and lines 15a and 15b are spaced apart from each other. Since the signal line 13 and lower electrodes 14a and 14b are separate, the conduction of noise from the lower electrodes 14a and 14b to the signal line 13 can be reduced. An insulating film 18 covers the exposed upper surfaces and side surfaces of the signal line 13, lower electrodes 14a and 14b, and lines 15a and 15b.

A convex (mountain-like) electrode portion is formed above the signal line 13 and lower electrodes 14a and 14b. This electrode portion includes the upper electrodes 31a and 31b and electrode 21.

In cross sectional view as shown in FIG. 2, the electrode 21, and the upper electrodes 31a and 31b are a convex shape.

The electrode 21 is formed above the signal line 13 so as to oppose it. The electrode 21 and signal line 13 function as electrodes of a variable capacitor 20. This embodiment is the variable capacitor 20 that varies the capacitance value between the signal line 13 and electrode 21 by moving the electrode 21 biased to the ground potential.

The upper electrodes 31a and 31b are arranged above the lower electrodes 14a and 14b to oppose the lower electrodes 14a and 14b, respectively. The lower electrodes 14a and 14b and upper electrodes 31a and 31b respectively form the electrostatic actuator portions 30a and 30b. When a potential difference is applied between the lower electrode 14a and upper electrode 31a and between the lower electrode 14b and upper electrode 31b, the electrostatic attraction brings the upper and lower electrodes of the actuator portions 30a and 30b into contact with the lower electrodes 14a and 14b, thereby driving the electrode 21 downward.

A cavity (gap) portion 19 is formed between the signal line 13 and electrode 21 and between the lower electrodes 14a and 14b and upper electrodes 31a and 31b, so that the upper electrodes 31a and 31b and electrode 21 can be driven to change the capacitance value of the variable capacitor 20.

More specifically, the upper electrode 31a is formed obliquely to the lower electrode 14a so that the distance between the upper electrode 31a and lower electrode 14a in an end portion on the side of the electrode 21 is greater than that between them in an end portion on the opposite side. Likewise, the upper electrode 31b is formed obliquely to the lower electrode 14b so that the distance between the upper electrode 31b and lower electrode 14b in an end portion on the side of the electrode 21 is greater than that between them in an end portion on the opposite side. Accordingly, the boundary portion between the upper electrode 31a and electrode 21 has a convex shape, and the boundary portion between the upper electrode 31b and electrode 21 has a convex shape. The insulating layers 41a and 41b are separately formed in these convex boundary portions. The insulating layer 41a is formed on the upper electrode 31a and electrode 21 in the boundary portion between them so as to fill the gap in this boundary portion. Similarly, the insulating layer 41b is formed on the upper electrode 31b and electrode 21 in the boundary portion between them so as to fill the gap in this boundary portion.

As shown in FIG. 2, the insulating layer 41a and 41b are T-shape in a cross sectional view.

In this embodiment, the electrode 21 and anchors 23a, 23b, 33a, and 33b are arranged on the same wiring level. The end portions of the upper electrodes 31a and 31b away from the electrode 21 are connected to the anchors 33a and 33b by the inclined spring structure portions 32a and 32b, respectively. As shown in FIG. 1, insulating layers 43a and 43b are formed on the upper surfaces of the connecting portions of the spring structure portions 32a and 32b and anchors 33a and 33b, respectively. The insulating layers 43a and 43b are made of the same material as that of the insulating layers 41a and 41b. As shown in FIG. 2, the insulating layers 43a and 41a bend the electrode portion into a V-shape in the actuator portion 30a. Analogously, the insulating layers 43b and 41b bend the electrode portion into a V-shape in the actuator portion 30b. In this manner, the upper electrodes 31a and 31b can be inclined. In a state before driving, one end portion of each of the upper electrodes 31a and 31b may also be in contact with a corresponding one of the lower electrodes 14a and 14b.

(B-B' Sectional Structure)

Figure 3:
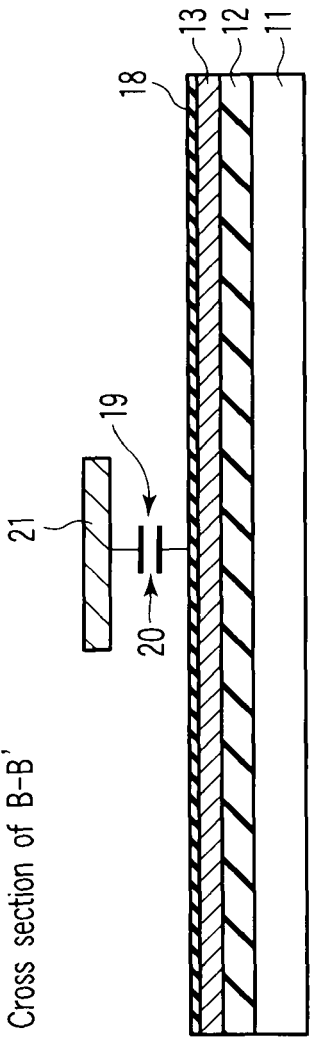
FIG. 3 is a sectional view taken along a line B-B' in FIG. 1.

FIG. 3 is a sectional view taken along a line B-B' in FIG. 1. The B-B' sectional structure of the electrostatic actuator will be explained below. Note that the structure of this embodiment is symmetrical with respect to the line B-B' in FIG. 1.

As shown in FIG. 3, the insulating film 12 is formed on the substrate 11, and the signal line 13 is formed on the insulating film 12. The insulating film 18 covers the upper surface of the signal line 13. The electrode 21 is formed above the signal line 13 so as to be spaced apart from the insulating film 18. Therefore, the cavity portion 19 exists between the electrode 21 and signal line 13.

[1-2] Driving States

FIGS. 4 and 5 are sectional views showing the states before and after the electrostatic actuator shown in FIG. 2 is driven. FIG. 4 shows the state before driving, and FIG. 5 shows the state after driving. The driving state of the electrostatic actuator will be explained below. Note that the driving state of the actuator portion 30b will be mainly explained, but the driving state of the actuator portion 30a is the same.

As shown in FIG. 4, letting x1 be the position of the end portions of the lower electrode 14b and upper electrode 31b on the side of the electrode 21, and x2 be the position of the end portions on the opposite side. In this state before driving, a distance y1 between the lower electrode 14b and upper electrode 31b in the position x1 is greater than a distance y2 between them in the position x2.

In this state, a voltage is applied to the lines 15b and 16b to give a potential difference between the lower electrode 14b and upper electrode 31b. As a consequence, the electrostatic attraction acts between the lower electrode 14b and upper electrode 31b. This electrostatic attraction increases as the distance between the lower electrode 14b and upper electrode 31b shortens. First, therefore, the lower electrode 14b and upper electrode 31b in the position x2 pull in with the insulating film 18 interposed between them. When the potential difference between the lower electrode 14b and upper electrode 31b further increases, the area of the contact region between them increases in a direction from the position x2 to the position x1. In this manner, the lower electrode 14b and upper electrode 31b are closed like a zipper in the direction from the position x2 to the position x1.

Consequently, as shown in FIG. 5, almost the entire surfaces of the lower electrode 14a and upper electrode 31a come in contact with each other with the insulating film 18 interposed between them, and almost the entire surfaces of the lower electrode 14b and upper electrode 31b come in contact with each other with the insulating film 18 interposed between them. Accordingly, the electrode 21 connecting to the upper electrodes 31a and 31b with the insulating layers 41a and 41b interposed between them goes down and comes in contact with the entire surface of the insulating film 18 on the signal line 13. This makes it possible to obtain a large contact force between the electrode 21 and signal line 13, and increase the capacitance ratio.

Note that if the insulating layers 41a and 41b are sufficiently strong, the convex shape of the boundary portion between the electrode 21 and upper electrode 31a and that of the boundary portion between the electrode 21 and upper electrode 31b are almost maintained. When the electrode 21 and signal line 13 come in contact with each other with the insulating film 18 interposed between them, therefore, the electrode 21 has a recessed shape in which the two end portions rise from the central portion.

[1-3] Inclination of Upper Electrode

Figure 6A:
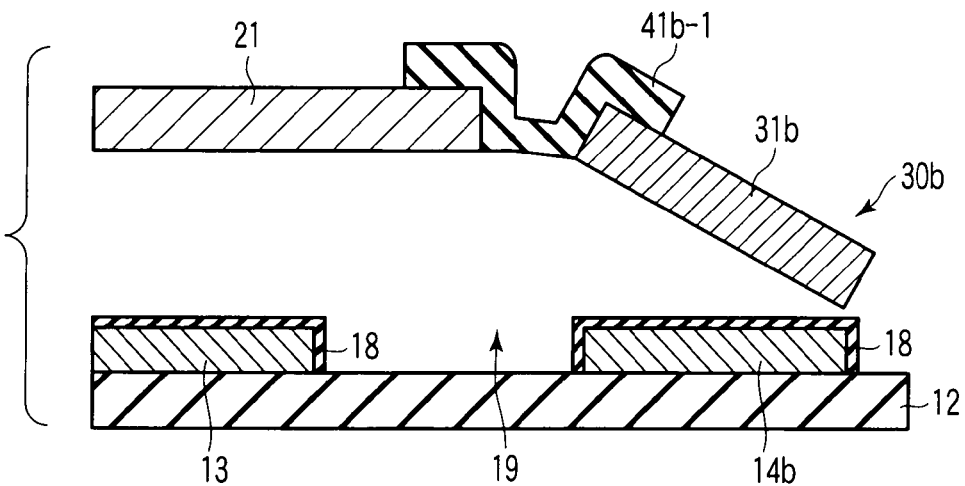
FIGS. 6A to 6C are views each showing an example for achieving the inclination of an upper electrode of an actuator portion according to the first embodiment.
Figure 6B:
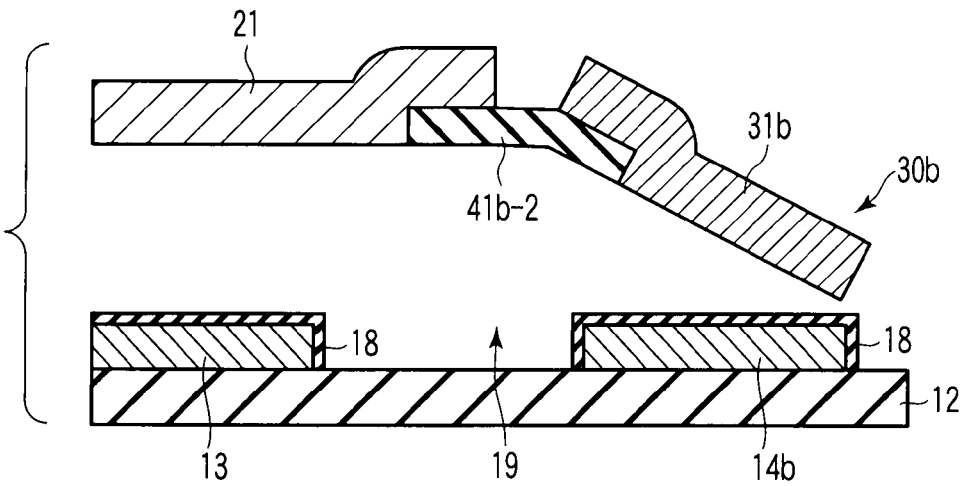
Figure 6C:
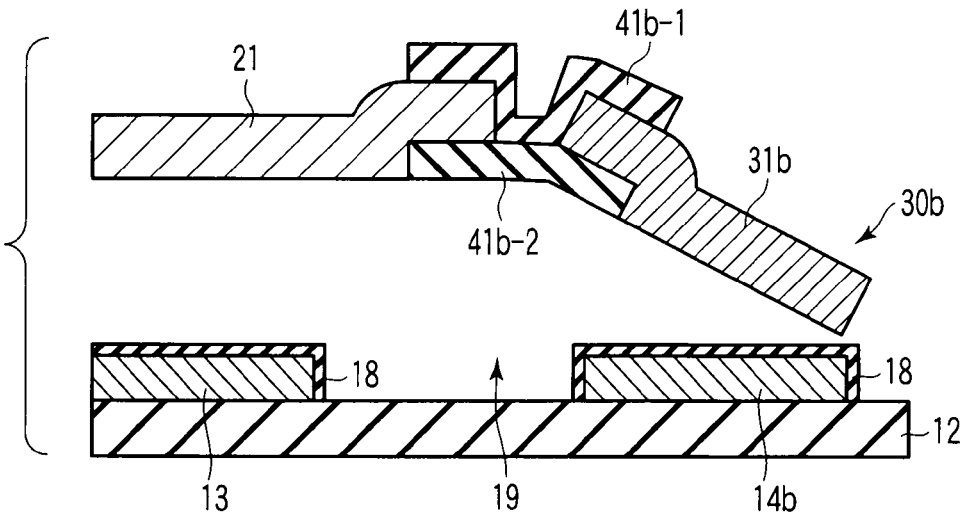

FIGS. 6A to 6C illustrate examples for achieving the inclination of the upper electrode of the actuator portion according to the first embodiment. The first to third examples of an upper electrode inclining method will be explained below. Note that the upper electrode 31b of the actuator portion 30b will be mainly explained, but the same shall apply to the upper electrode 31a of the actuator portion 30a.

First Example

In the first example as shown in FIG. 6A, the electrode 21 and upper electrode 31b are formed apart from each other, and an insulating layer 41b-1 is formed between the electrode 21 and upper electrode 31b and on the end portions of the electrode 21 and upper electrode 31b. The compressive stress of the insulating layer 41b-1 is larger than those of the electrode 21 and upper electrode 31b. This achieves the inclination of the upper electrode 31b, thereby giving a convex shape to the boundary portion between the electrode 21 and upper electrode 31b.

For example, Al having a tensile residual stress is used as the electrode 21 and upper electrode 31b, and SiN or $SiO_2$ having a compressive residual stress is used as the insulating layer 41b-1. The thickness of the insulating layer 41b-1 is desirably 1 µm or more. This makes it possible to sufficiently strongly connect the electrode 21 and upper electrode 31b.

A method of manufacturing the structure of the first example is as follows. First, an insulating film 18 is formed on the upper surfaces and side surfaces of the lower electrode 14b and signal line 13, and a sacrificial layer (not shown) is deposited on the insulating films 12 and 18. Then, the sacrificial layer is processed into the shape of the cavity portion 19. A metal material is deposited on this sacrificial layer and processed. As a consequence, the electrode 21 and upper electrode 31b are spaced apart from each other. Subsequently, an insulating layer 41b-1 is deposited on the sacrificial layer, electrode 21, and upper electrode 31b. The insulating layer 41b-1 is then processed to be left behind in the boundary portion between the electrode 21 and upper electrode 31b. After that, the sacrificial layer is removed.

Second Example

In the second example as shown in FIG. 6B, the electrode 21 and upper electrode 31b are formed apart from each other, and an insulating layer 41b-2 is formed below the end portions of the electrode 21 and upper electrode 31b. The tensile stress of the insulating layer 41b-2 is larger than those of the electrode 21 and upper electrode 31b. This achieves the inclination of the upper electrode 31b, thereby giving a convex shape to the boundary portion between the electrode 21 and upper electrode 31b.

For example, Al having a tensile residual stress is used as the electrode 21 and upper electrode 31b, and SiN having a tensile stress larger than that of Al is used as the insulating layer 41b-2. The thickness of the insulating layer 41b-2 is desirably 1 µm or more. This makes it possible to sufficiently strongly connect the electrode 21 and upper electrode 31b.

A method of manufacturing the structure of the second example is as follows. First, an insulating film 18 is formed on the upper surfaces and side surfaces of the lower electrode 14b and signal line 13, and a sacrificial layer (not shown) is deposited on the insulating films 12 and 18. Then, the sacrificial layer is processed into the shape of the cavity portion 19. An insulating layer 41b-2 is deposited on this sacrificial layer and processed into the shape shown in FIG. 6B. Subsequently, a metal material is deposited on the sacrificial layer and insulating layer 41b-2 and processed. As a consequence, the electrode 21 and upper electrode 31b are spaced apart from each other. After that, the sacrificial layer is removed.

Third Example

In the third example as shown in FIG. 6C, the electrode 21 and upper electrode 31b are formed apart from each other, an insulating layer 41b-1 is formed between the electrode 21 and upper electrode 31b and on the end portions of the electrode 21 and upper electrode 31b, and an insulating layer 41b-2 is formed below the end portions of the electrode 21 and upper electrode 31b. In the third example, therefore, the insulating layers 41b-1 and 41b-2 sandwich the end portions of the electrode 21 and upper electrode 31b, thereby forming a three-layered structure. The residual stresses of the insulating layers 41b-1 and 41b-2, upper electrode 31b, and electrode 21 are controlled so as to give a convex shape to the three-layered portion.

For example, Al having a tensile residual stress is used as the electrode 21 and upper electrode 31b, SiN having a compressive residual stress is used as the insulating layer 41b-1, and SiN having a tensile residual stress is used as the insulating layer 41b-2. The thickness of the insulating layer 41b-2 can be equal to, larger than, or smaller than that of the insulating layer 41b-1. The total thickness of the insulating layers 41b-1 and 41b-2 is desirably 1 µm or more. This makes it possible to sufficiently strongly connect the electrode 21 and upper electrode 31b.

[1-4] Shape of Insulating Layer

Figure 7A:
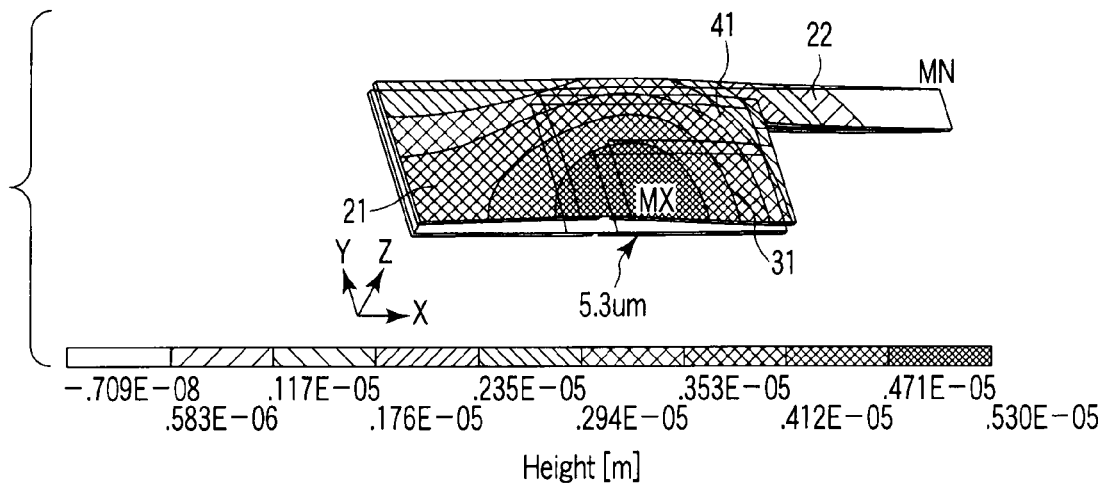
FIGS. 7A to 7C are views showing how the upper electrode and an electrode are distorted in accordance with the differences between the shapes of an insulating layer according to the first embodiment.
Figure 7B:
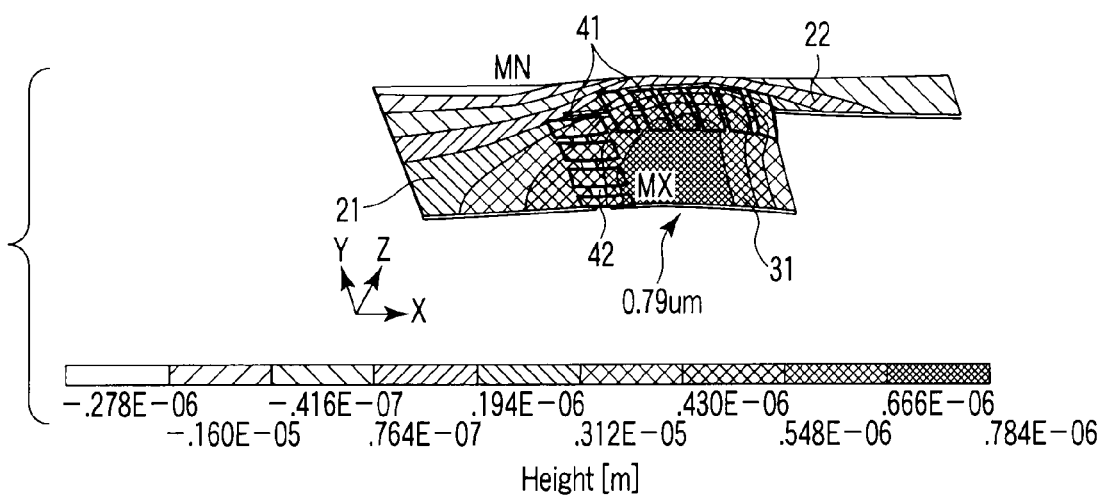
Figure 7C:
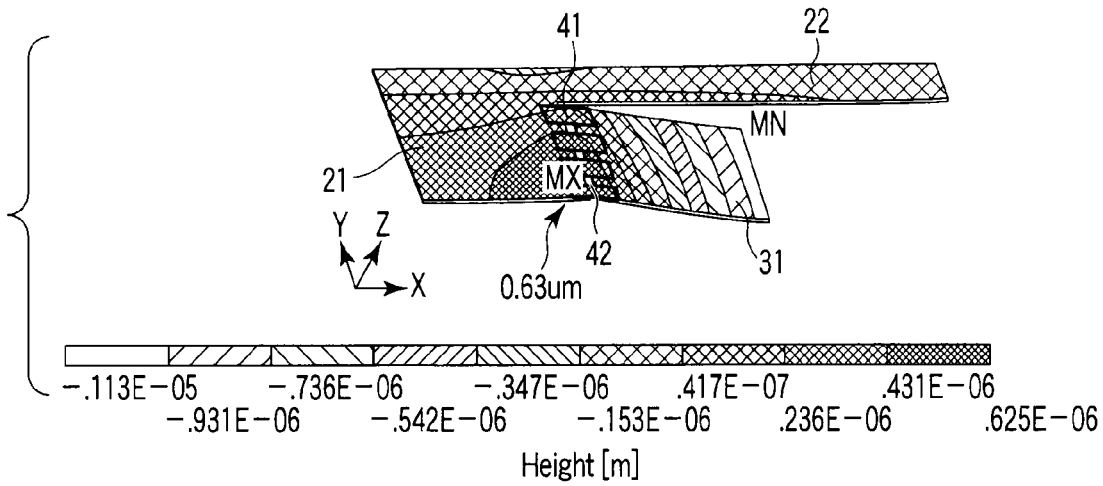

FIGS. 7A to 7C illustrate how the upper electrode and electrode are distorted in accordance with the differences between the shapes of the insulating layer according to the first embodiment of the present invention. That is, FIGS. 7A to 7C show the results of simulation performed by the finite element method to check how the shapes of the upper electrode 31, insulating layer 41, and electrode 21 change in accordance with the differences between the shapes of the insulating layer 41 upon application of a voltage. Note that in each of FIGS. 7A to 7C, MX indicates a position where the heights of the electrodes 21 and 31 are maximum, and MN indicates a position where the heights of the electrodes 21 and 31 are minimum.

In the example shown in FIG. 7A, the insulating layer 41 is formed not only in the boundary between the upper electrode 31 and electrode 21 but also in the boundary between the upper electrode 31 and beam 22. In this example, the height of the highest position MX is 5.3 µm.

In the example shown in FIG. 7B, the slit 42 is formed in the insulating layer 41 shown in FIG. 7A. In this example, the height of the highest position MX is 0.79 µm.

In the example shown in FIG. 7C, the insulating layer 41 is formed straight along only one side of the boundary portion between the upper electrode 31 and electrode 21, and the slit 42 is formed in the insulating layer 41. This example shown in FIG. 7C corresponds to the structure of the first embodiment shown in FIG. 1 and the like. In this example, the height of the highest position MX is 0.63 µm.

The highest position MX shown in FIG. 7B is lower than that shown in FIG. 7A. This indicates that the distortion of the electrode can be reduced by forming the slit 42 in the insulating layer 41. This distortion is presumably produced by the stress difference between the insulating layer 41 and electrodes 21 and 31.

Also, the highest position MX shown in FIG. 7C is lower than that shown in FIG. 7B. This reveals that the distortion can be reduced by straightly connecting one side of the upper electrode 31 to the electrode 21, rather than by connecting two sides of the upper electrode 31 to the electrode 21 and beam 22. It is possible by thus reducing the distortion to suppress the rise in driving voltage and the decrease in capacitance ratio.

Next, the slits 42a and 42b in the insulating layers 41a and 41b when connecting the electrode 21 and upper electrodes 31a and 31b by using one side of each electrode will be explained below with reference to FIGS. 8A, 8B, 9A, and 9B.

Figure 8A:
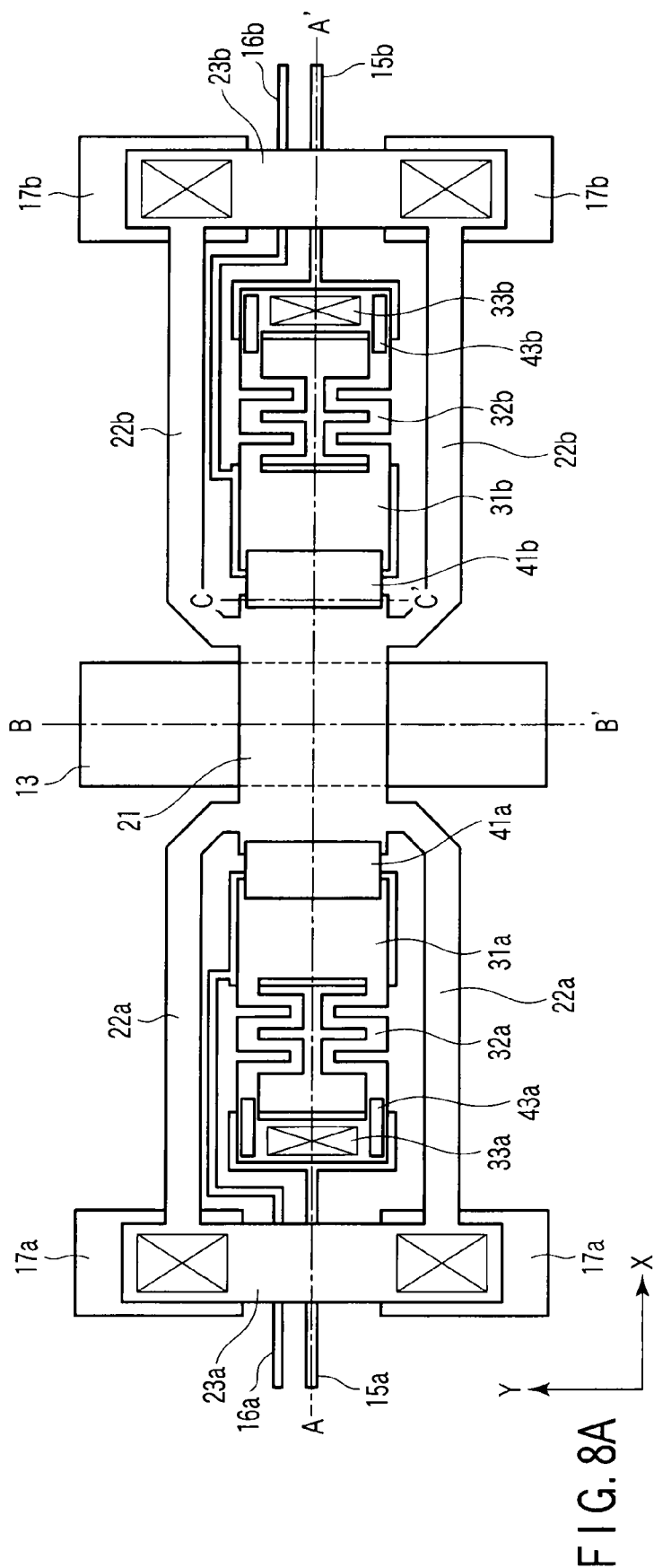
FIGS. 8A and 8B are a top view and sectional view, respectively, of an electrostatic actuator having a slitless insulating layer according to a reference example.
Figure 8B:
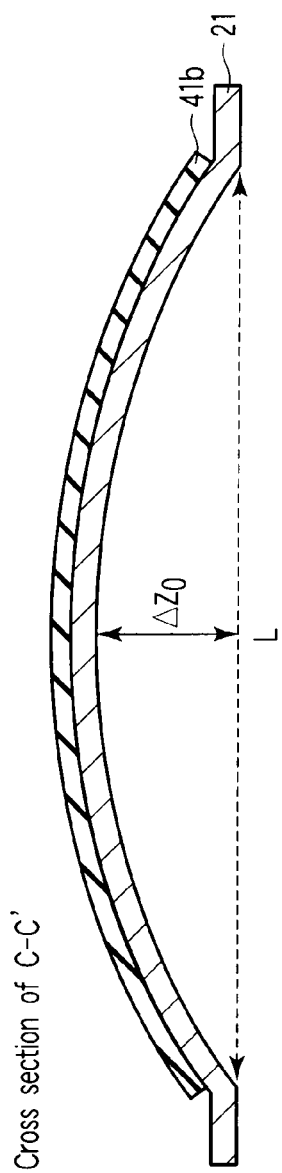

Referring to FIGS. 8A and 8B, the insulating layers 41a and 41b connect the electrode 21 and upper electrodes 31a and 31b by using one side of each electrode, but no slits are formed in the insulating layers 41a and 41b.

In a C-C' section as shown in FIG. 8B, the stress difference between the insulating layer 41b and electrode 21 warps the electrode 21. Letting ρ be the radius of curvature of a portion where the insulating layer 41b and electrode 21 overlap each other, and L be the length of this overlap portion, a warping amount $\Delta Z_0$ is given by $$\Delta Z_0 = \frac{L^2}{8\rho}$$

Figure 9A:
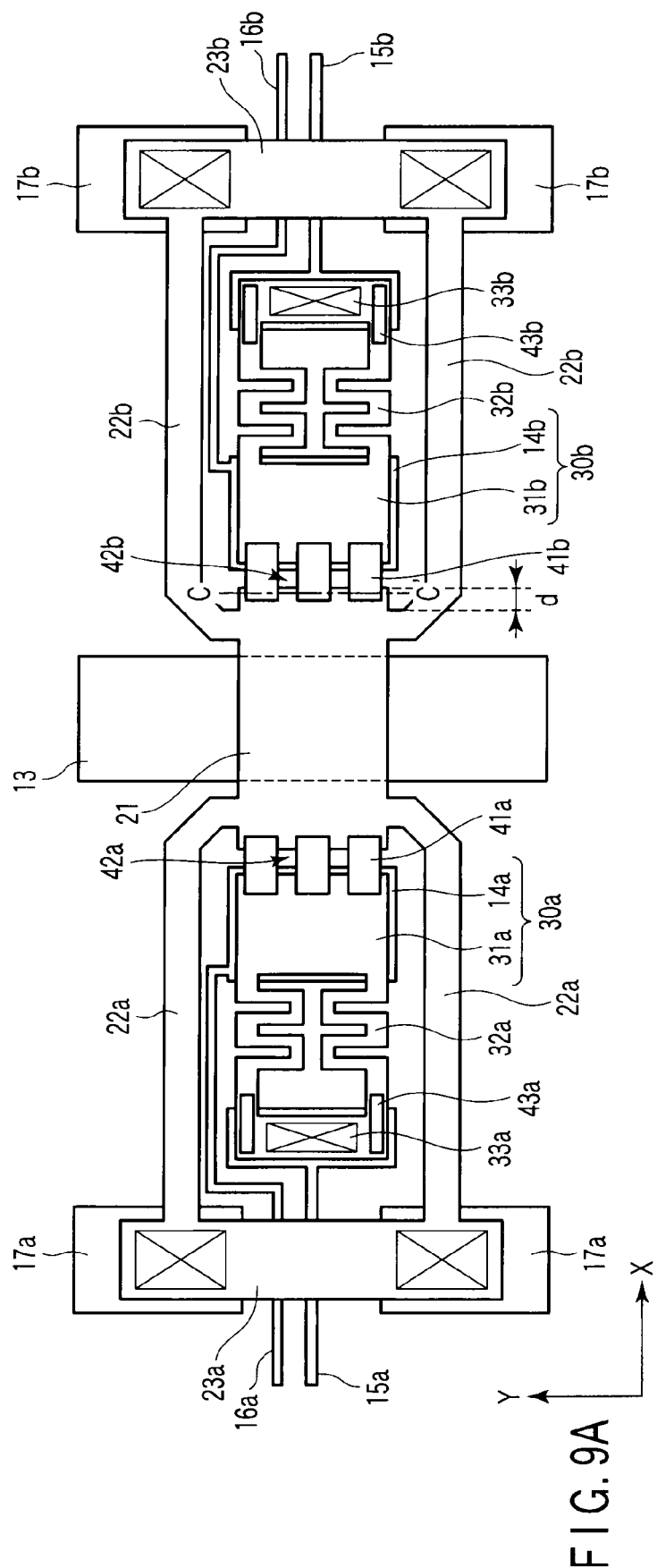
FIGS. 9A and 9B are a top view and sectional view, respectively, of an electrostatic actuator having a slit insulating layer according to the first embodiment.
Figure 9B:
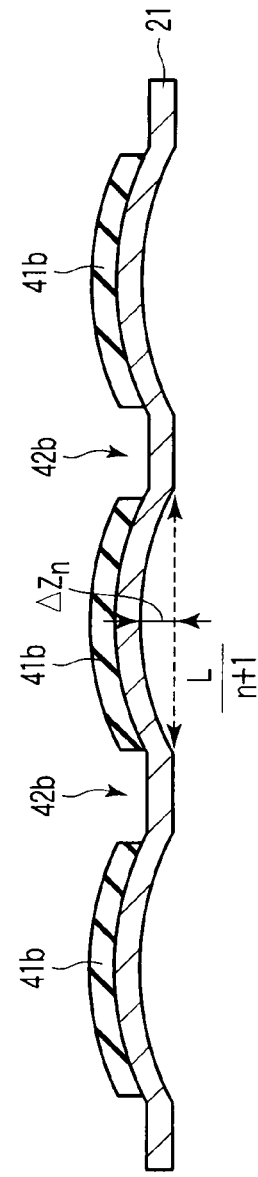

Referring to FIGS. 9A and 9B, the insulating layers 41a and 41b connect the electrode 21 and upper electrodes 31a and 31b by using one side of each electrode, and the slits 42a and 42b are respectively formed in the insulating layers 41a and 41b. If the width of the slits 42a and 42b is sufficiently small, the total length of portions where the insulating layers 41a and 41b and electrode 21 overlap each other can be made almost equal to the length L shown in FIG. 8B. This means that even when the slits 42a and 42b are formed, the connection strength between the electrode 21 and each of the upper electrodes 31a and 31b does not decrease.

Assuming that n slits are formed, as shown in FIG. 9B, the length of one unit of the overlap portion is L/(n+1). The radius of curvature ρ of this overlap portion is determined by the stress difference between the insulating layer 41b and electrode 21, and hence is the same as that shown in FIG. 8B. Accordingly, a warping amount $\Delta Z_n$ is given by $$\Delta Z_n = \frac{1}{(n+1)^2} \times \frac{L^2}{8\rho}$$

The warping amount $\Delta Z_n$ is proportional to the square of the length of the overlap portion. Therefore, the warping of the electrode 21 can be largely reduced by forming the slits 42a and 42b in the insulating layers 41a and 41b, respectively.

Note that in FIG. 9A, the number of each of the slits 42a and 42b formed in the insulating layers 41a and 41b is two. However, three or more slits may also be formed.

Also, even when the slit 42b is formed as shown in FIG. 9B, the stress difference between the insulating layer 41b and electrode 21 warps portions where the insulating layer 41b and electrode 21 overlap each other, thereby slightly undulating the electrode 21. As shown in FIG. 9A, however, the connecting portion of the electrode 21 and beam 22b is spaced apart from the end of the electrode 21 by a distance d. This makes the electrode 21 almost flat above the signal line 13. According to the simulation, the distance d is preferably 10 μm or more.

[1-5] [Driving Voltage]

Figure 10:
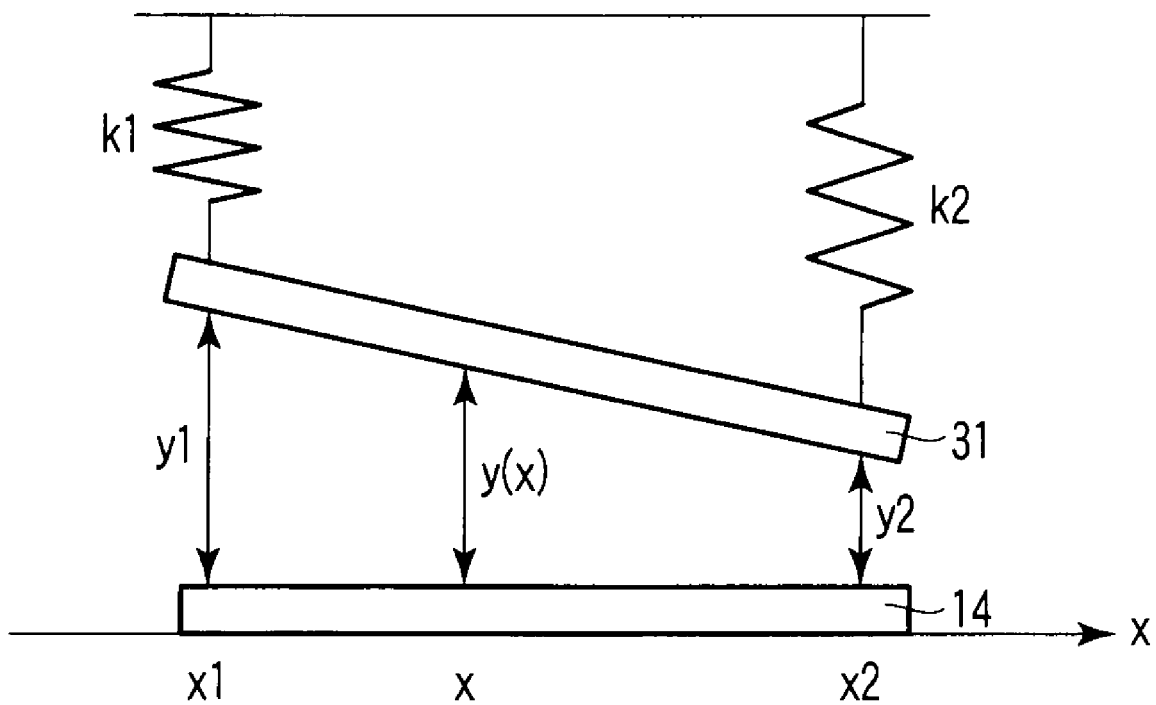
FIG. 10 is a schematic view of the actuator portion according to the first embodiment.

FIG. 10 is a schematic view of the actuator portion according to the first embodiment of the present invention. FIGS. 11A to 11D illustrate changes in potential shape when increasing the potential difference between the electrodes of the actuator portion according to the first embodiment of the present invention. The ability to decrease the driving voltage by using an inclined electrode structure will be explained below.

In a model of the actuator portion shown in FIG. 10, the upper electrode 31 of the actuator portion is formed obliquely to the lower electrode 14, and springs having spring constants k1 and k2 are connected to the two ends of the upper electrode 31.

This model shown in FIG. 10 will be explained by using the arrangement shown in FIG. 1. In FIG. 10, k1 is a spring constant from the electrode 21 to the anchor 23a, or a spring constant from the electrode 21 to the anchor 23b. Also, k2 is a spring constant from the electrode 31a to the anchor 33a, or a spring constant from the electrode 31b to the anchor 33b.

Condition k1>k2 holds between the spring constants k1 and k2. This condition is achieved by the following structure. For example, lines forming the beams 22a and 22b are made thicker than those forming the spring structures 32a and 32b. Alternatively, the planar shape of the spring structures 32a and 32b is formed into a meander shape.

Since k1>k2 holds, a resistance R1 of the beams 22a and 22b is lower than a resistance R2 of the spring structures 32a and 32b. The resistance R1 of the beams 22a and 22b is desirably as low as possible because this resistance produces a loss of an RF signal. On the other hand, the resistance R2 of the spring structures 32a and 32b can be more or less high because the time constant of voltage application to the driving electrode need only be 100 nsec.

The driving voltage in the model shown in FIG. 10 can be obtained by solving a potential problem. The potential is represented by $$U = Ues + Uk$$

Electrostatic energy Ues and elastic energy Uk are represented by $$Ues = -\frac{\varepsilon_0 A V^2}{2} \frac{\log(y2/y1)}{y2 - y1}$$

$$Uk = \frac{1}{2}k1(d1 - y1)^2 + \frac{1}{2}k2(d2 - y2)^2$$

where d1 and d2 are the distances y1 and y2 in the positions x1 and x2 when the potential difference between the upper electrode 31 and lower electrode 14 is 0V, $\varepsilon_0$ is the dielectric constant, and A is the area of the upper electrode 31. The parameters d1, d2, x1, and x2 are obtained in accordance with FIG. 10 by the finite element method as shown in Table 1 below.

TABLE 1

| | |
|---|---|
| k1 | 4.23 N/m |
| k2 | 2.94 N/m |
| d1 | 2.5 μm |
| d2 | 0.254 μm |

When a potential difference V between the upper electrode 31 and lower electrode 14 is increased, the potential shape changes as shown in FIGS. 11A to 11D.

Figure 11A:
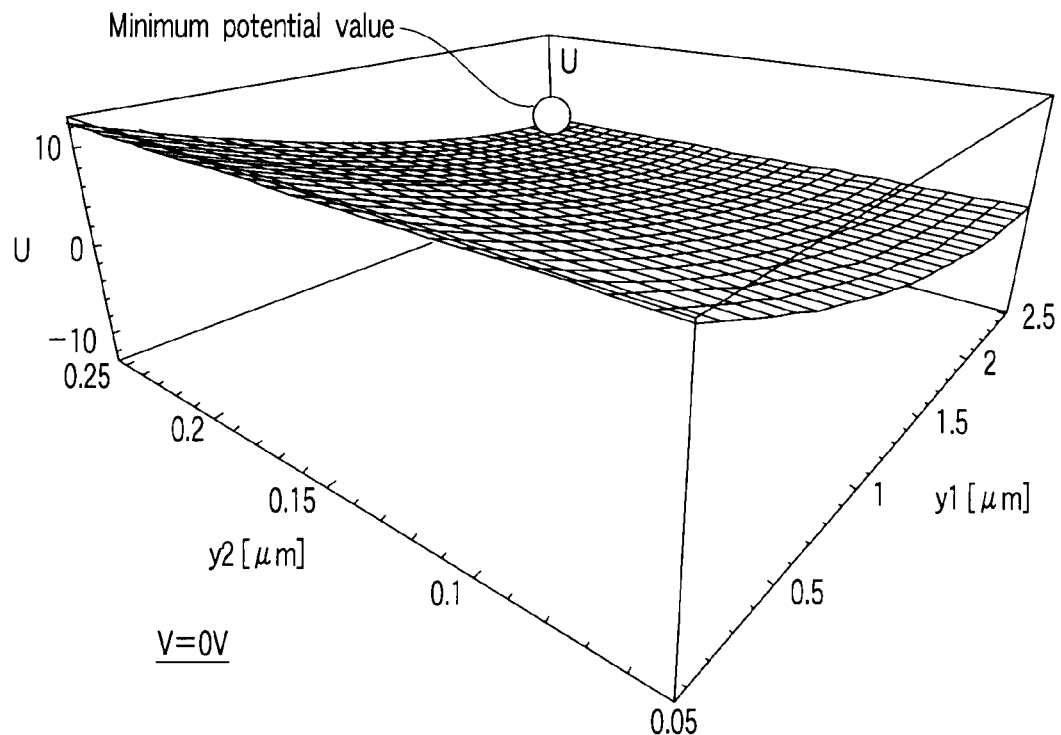
FIG. 11A is a view showing a potential shape when the potential difference between the electrodes of the actuator portion according to the first embodiment is 0.

When the potential difference V is 0V, as shown in FIG. 11A, the distance y1 between the upper electrode 31 and lower electrode 14 in the position x1 is 2.5 μm, and the distance y2 between them in the position x2 is 0.25 μm.

Figure 11B:
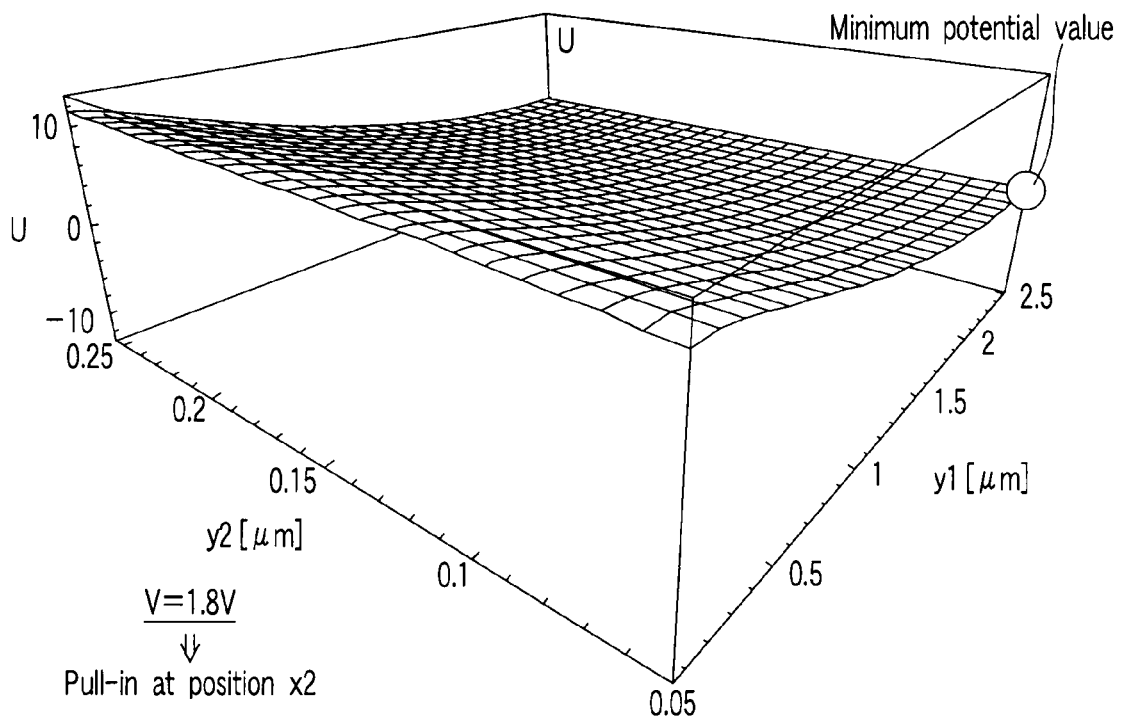
FIG. 11B is a view showing a potential shape when the potential difference between the electrodes of the actuator portion according to the first embodiment is 1.8V.

When the potential difference V is increased to 1.8V, as shown in FIG. 11B, the distance y1 between the upper electrode 31 and lower electrode 14 in the position x1 remains 2.5 μm, but the distance y2 between them in the position x2 is 0.05 μm, i.e., almost 0. That is, when the potential difference V is 1.8V, the upper electrode 31 and lower electrode 14 in the position x2 pull in.

When the potential difference V is increased to 5V, as shown in FIG. 11C, the distance y1 between the upper electrode 31 and lower electrode 14 in the position x1 shortens to 2.0 μm, while they in the position x2 keep pulling in.

When the potential difference V is further increased to 8.8V, as shown in FIG. 11D, the upper electrode 31 and lower electrode 14 in the position x1 pull in, while they in the position x2 keep pulling in.

In this example, therefore, the voltage at which the upper electrode 31 and lower electrode 14 entirely pull in is 8.8V. By contrast, the pull-in voltage when the electrode of the actuator has no inclination and k1=k2 is 20.9V. This demonstrates that the driving voltage can be decreased to the half or less in this example.

The driving voltage can be decreased as described above mainly because the distance y2 between the upper electrode 31 and lower electrode 14 in the position x2 is short, and k1>k2 holds. Under these two conditions, pull-in occurs at a low voltage in the position x2. Furthermore, pull-in in the position x2 shortens the distance between the upper electrode 31 and lower electrode 14 in the vicinity of the position x2. Since this facilitates pull-in, pull-in abruptly occurs toward the position x1 even when the potential difference V is slightly raised. Consequently, pull-in occurs in the position x1 at a voltage lower than that when the electrode has no inclination.

[1-6] Effects

In the first embodiment of the present invention, the upper electrodes 31a and 31b of the actuator portions 30a and 30b are arranged obliquely to the lower electrodes 14a and 14b, thereby shortening the distance y2 between the upper electrodes 31a and 31b and lower electrodes 14a and 14b on the sides away from the electrode 21. Accordingly, strong electrostatic attraction acts between the upper electrodes 31a and 31b and lower electrodes 14a and 14b in the position x2, so pull-in occurs at a low voltage. Since pull-in thus begins, pull-in between the upper electrodes 31a and 31b and lower electrodes 14a and 14b readily occurs like a zipper from the position x2 to the position x1, thereby decreasing the driving voltage.

Also, in this embodiment, the upper electrodes 31a and 31b of the actuator portions 30a and 30b are arranged obliquely to the lower electrodes 14a and 14b, thereby giving a convex shape to the boundary portions between the upper electrodes 31a and 31b and electrode 21. The strong insulating layers 41a and 41b are formed in these boundary portions. Therefore, even when the upper electrodes 31 and 31b and lower electrodes 14a and 14b entirely pull in, the convex shape is maintained. Since this gives the electrode 21 a recessed shape, the electrode 21 is strongly pressed to the signal line 13, and a large capacitance value is obtained. As a consequence, a high capacitance ratio is obtained.

Furthermore, this embodiment gives the spring constants condition k1>k2 instead of decreasing the spring constants. This may reduce a stiction failure occurring when decreasing the spring constants.

Moreover, when the electrostatic actuator has a cantilever structure as disclosed in MEMS SWITCH LIBRARY pp. 130-139, the electrode 21 largely warps by about a few ten μm in the form of a recess. This makes packaging difficult. By contrast, the electrostatic actuator of this embodiment has a bridge structure. Accordingly, it is possible to suppress the warping of the electrode 21 by holding the two ends of the electrode 21 by the upper electrodes 31a and 31b, and facilitate packaging. In addition, in this embodiment adopting the bridge structure, the distance between the electrodes 13 and 21 forming the variable capacitor 20 is the thickness of the sacrificial layer. Therefore, the electrostatic actuator is hardly influenced by the temperature characteristic.

[2] Second Embodiment

The second embodiment is an example in which an electrostatic actuator is applied to a variable capacitor as in the first embodiment. Although the ground potential is applied to the electrode 21 in the first embodiment, an electrode 21 is floated in the second embodiment. Note that differences from the first embodiment will be mainly explained in the second embodiment.

[2-1] Structure of Electrostatic Actuator

Figure 12:
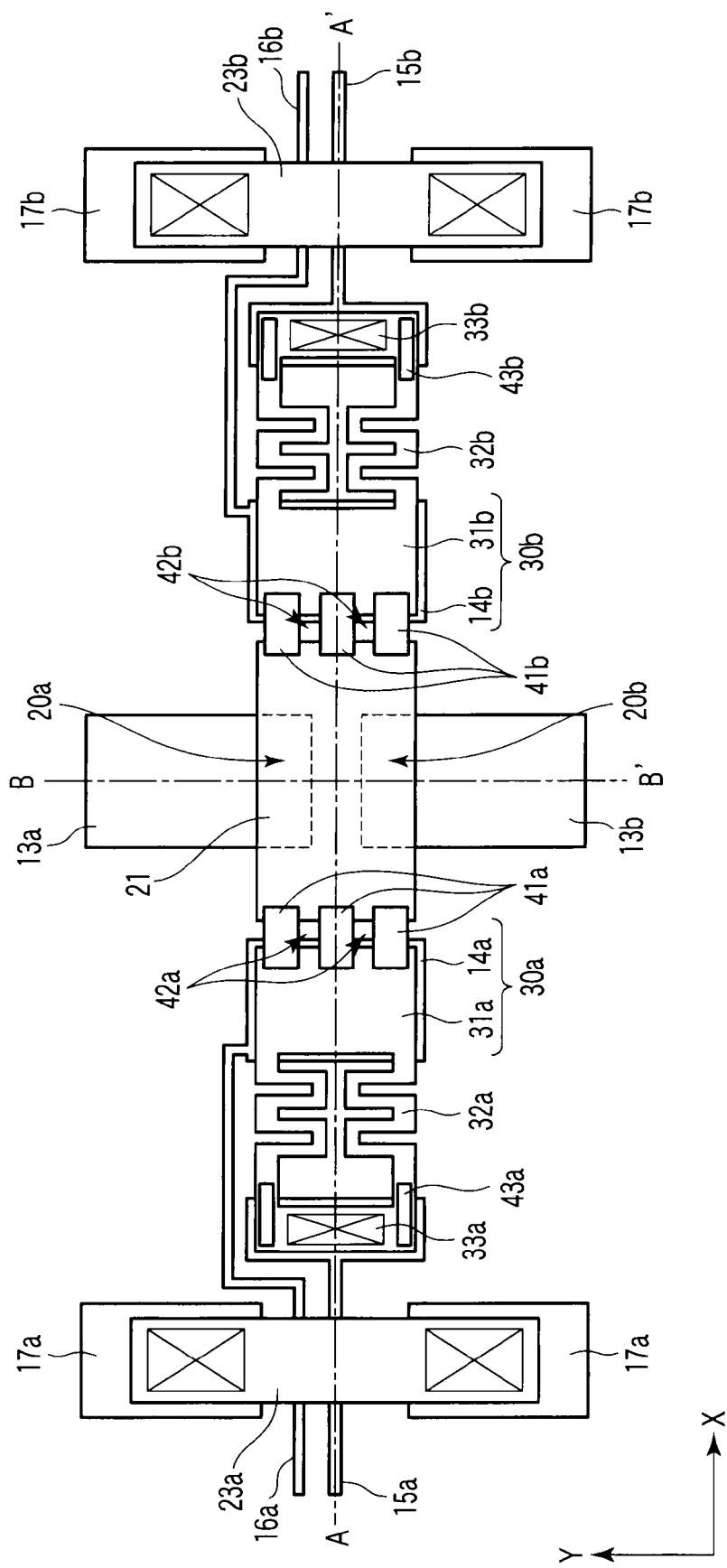
FIG. 12 is a top view of an electrostatic actuator according to the second embodiment.
Figure 13:
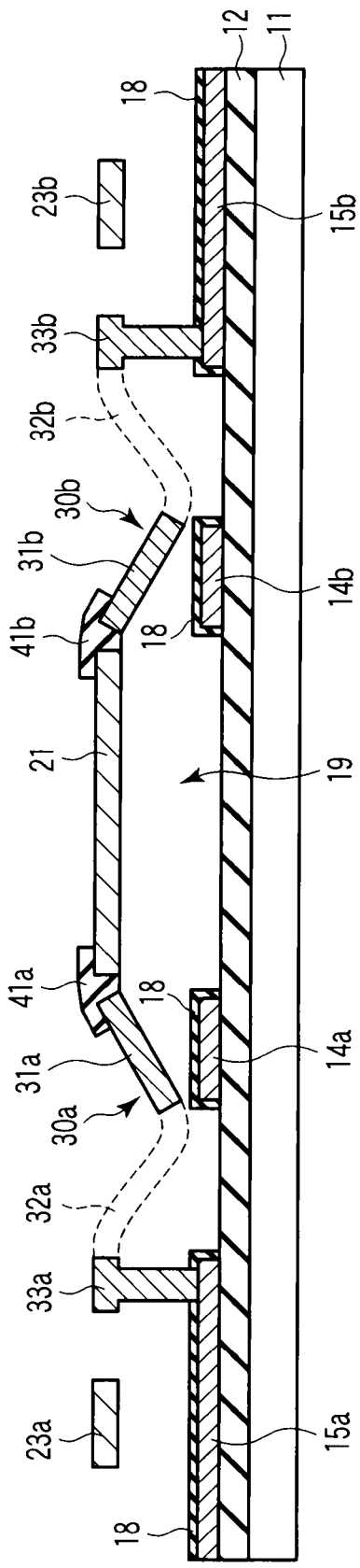
FIG. 13 is a sectional view taken along a line A-A' in FIG. 12.
Figure 14:
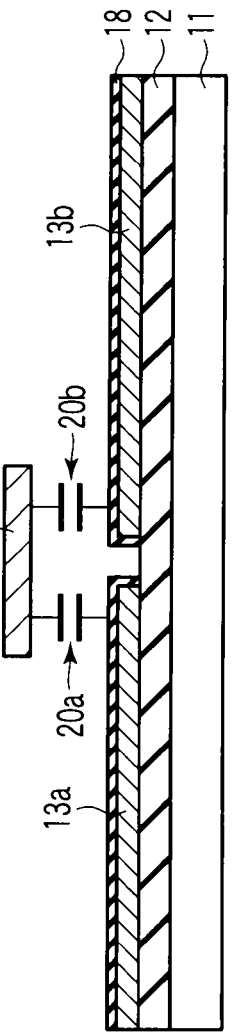
FIG. 14 is a sectional view taken along a line B-B' in FIG. 12.

FIG. 12 is a top view of the electrostatic actuator according to the second embodiment. FIG. 13 is a sectional view taken along a line A-A' in FIG. 12. FIG. 14 is a sectional view taken along a line B-B' in FIG. 12. The structure of the electrostatic actuator will be explained below.

As shown in FIGS. 12 to 14, the second embodiment differs from the first embodiment in that the electrode 21 is not connected to anchors 23a and 23b by the beams 22a and 22b shown in FIG. 1 but floated, and that signal lines 13a and 13b are spaced apart in the Y direction.

In this structure, it is possible by vertically moving the electrode 21 to change a capacitance 20a between the electrode 21 and signal line 13a and a capacitance 20b between the electrode 21 and signal line 13b.

[2-2] Effects

The second embodiment described above can achieve the same effects as in the first embodiment. In addition, the second embodiment achieves the effect of improving the isolation characteristic because the electrode 21 is floated. This embodiment is also advantageous in forming a CRLH-TL (Composite Right/Left Handed Transmission Line) having variable characteristics, because the variable capacitor is inserted in series with a transmission line.

[3] Third Embodiment

The third embodiment is an example in which an electrostatic actuator is applied to a switch, unlike in the first and second embodiments. Note that differences from the first embodiment will be mainly explained in the third embodiment.

[3-1] Structure of Electrostatic Actuator

Figure 15:
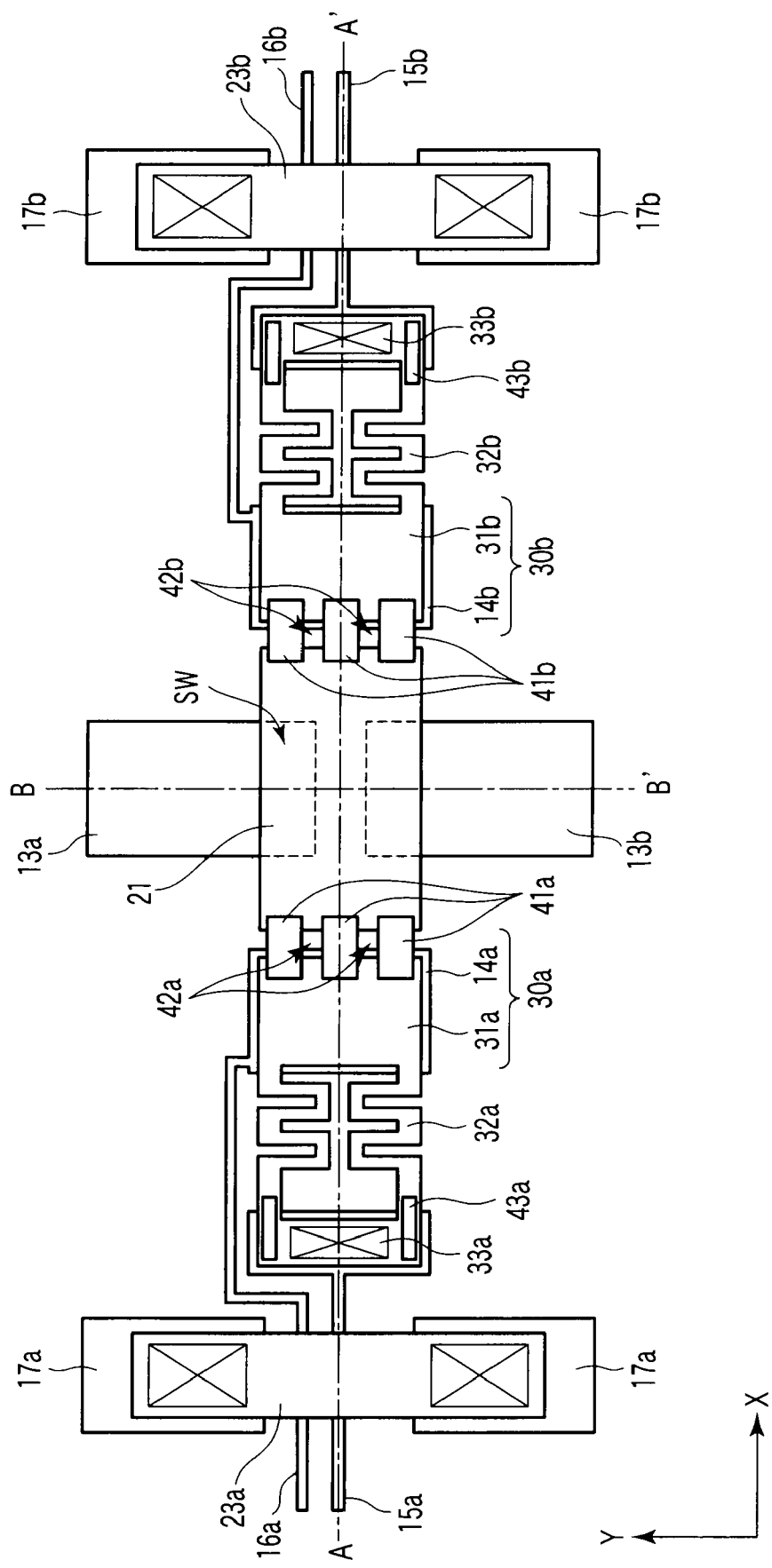
FIG. 15 is a top view of an electrostatic actuator according to the third embodiment.
Figure 16:
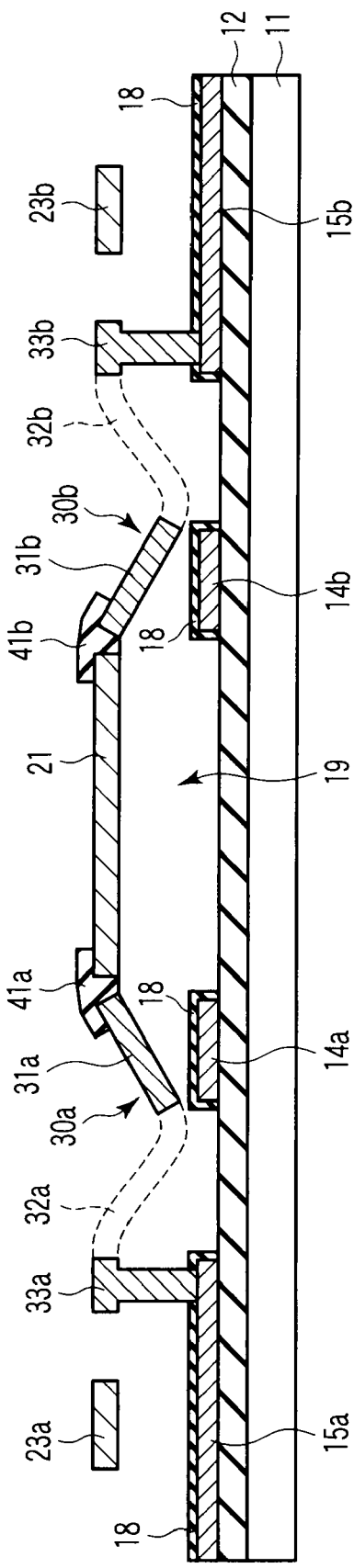
FIG. 16 is a sectional view taken along a line A-A' in FIG. 15.
Figure 17:
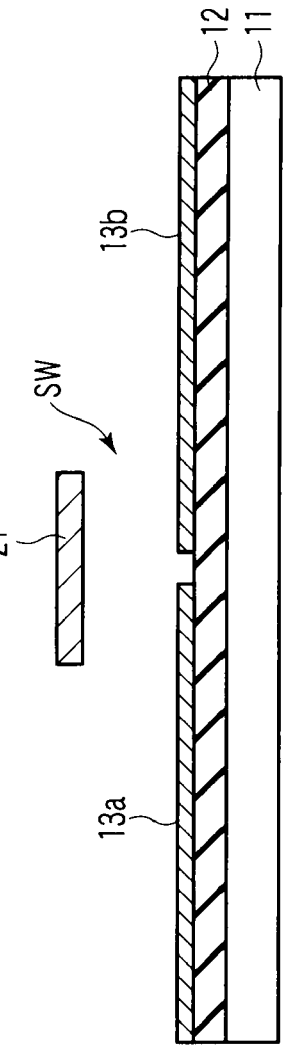
FIG. 17 is a sectional view taken along a line B-B' in FIG. 15.

FIG. 15 is a top view of the electrostatic actuator according to the third embodiment. FIG. 16 is a sectional view taken along a line A-A' in FIG. 15. FIG. 17 is a sectional view taken along a line B-B' in FIG. 15. The structure of the electrostatic actuator will be explained below.

As shown in FIGS. 15 to 17, the third embodiment differs from the first embodiment in that the electrode 21 is not connected to anchors 23a and 23b by the beams 22a and 22b shown in FIG. 1 but is floated, and that signal lines 13a and 13b are spaced apart in the Y direction and the insulating film 18 shown in FIG. 13 is not formed on the surfaces of the signal lines 13a and 13b.

In this structure, an electric current flows when the electrode vertically goes down and comes in contact with the signal lines 13a and 13b, thereby implementing a resistive switch SW. The switch SW is turned on when the electrode 21 comes in contact with the signal lines 13a and 13b, and turned off when the electrode 21 moves away from the signal lines 13a and 13b.

[3-2] Effects

The third embodiment described above can achieve the same effects as in the first embodiment. In addition, as is also apparent from FIG. 5 described previously, the contact resistance can be reduced because the contact force of the electrode 21 is strong in this structure. Accordingly, this embodiment can implement the switch SW having little loss.

Note that in the third embodiment, the structure of the second embodiment is modified into a switch. However, the structure of the first embodiment may also be modified into a switch by removing the insulating film 18 from the signal line 13.

[4] Fourth Embodiment

The fourth embodiment is an example in which an electrostatic actuator is applied to a variable capacitor as in the first and second embodiments. The fourth embodiment differs from the first and second embodiments in that thin films 51a and 51b are respectively formed on portions of beams 22a and 22b, and the beams 22a and 22b are inclined. Note that the differences from the first embodiment will be mainly explained in the fourth embodiment.

[4-1] Structures of Actuator

First Example

Figure 19:
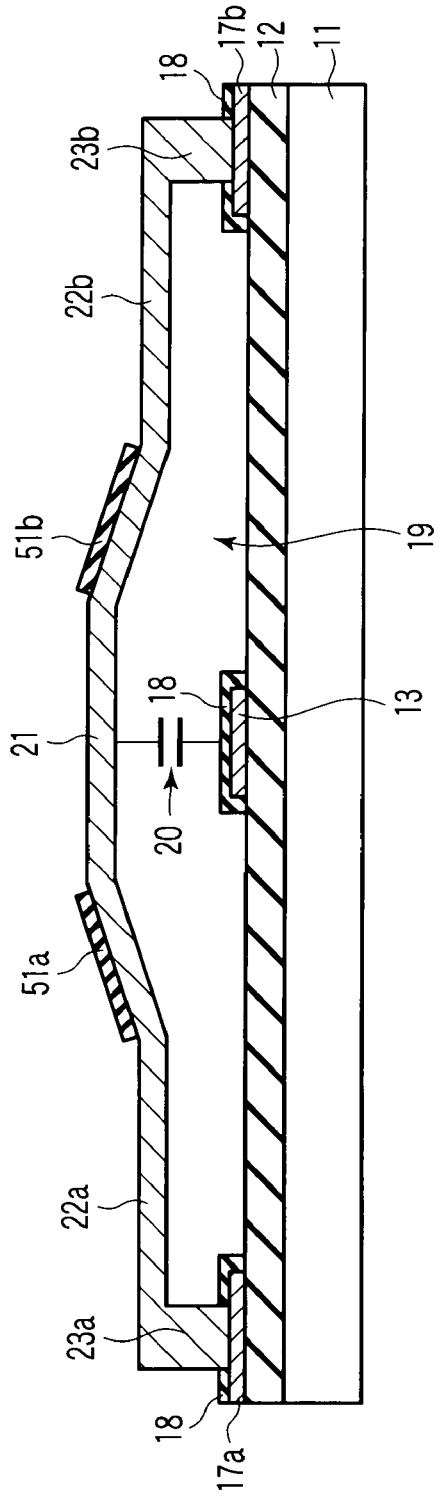
FIG. 19 is a sectional view taken along a line A-B-C-D-E-F in FIG. 18.
Figure 20:
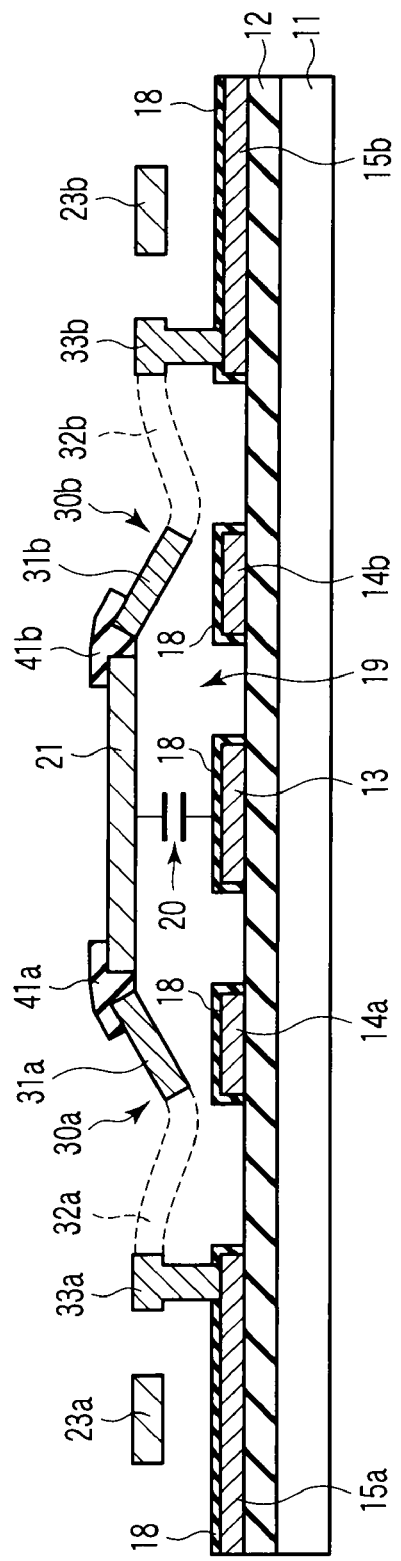
FIG. 20 is a sectional view taken along a line G-G' in FIG. 18.
Figure 21:
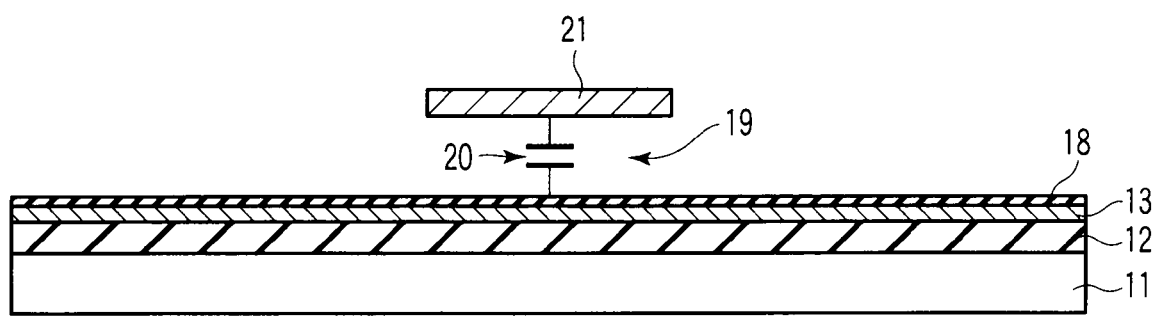
FIG. 21 is a sectional view taken along a line H-H' in FIG. 18.

FIG. 18 is a top view of the electrostatic actuator according to the fourth embodiment of the present invention. FIG. 19 is a sectional view taken along a line A-B-C-D-E-F in FIG. 18. FIG. 20 is a sectional view taken along a line G-G' in FIG. 18. FIG. 21 is a sectional view taken along a line H-H' in FIG. 18. The first example of the structure of the electrostatic actuator will be explained below.

As shown in FIGS. 18 to 21, the fourth embodiment differs from the first embodiment in that the thin films 51a and 51b are respectively formed on portions of the beams 22a and 22b, and these portions of the beams 22a and 22b are inclined. Note that the thin films 51a and 51b can be made of an insulating material or conductive material, and have a stress different from that of the beams 22a and 22b.

More specifically, as shown in FIG. 19, the beams 22a and 22b extend to the left and right from the two ends of an electrode 21 and are respectively connected to anchors 23a and 23b. The beams 22a and 22b have inclined portions that rise toward the electrode 21 from a substrate 11. The thin films 51a and 51b are formed on the upper surfaces of these inclined portions of the beams 22a and 22b, respectively.

Also, as shown in the top view of FIG. 18, the thin film 51a is formed on each of those two branched portions of the beam 22a which exist on the two sides of an actuator portion 30a in the Y direction, and the thin film 51b is formed on each of those two branched portions of the beam 22b which exist on the two sides of an actuator portion 30b in the Y direction. The beams 22a and 22b in the regions where the thin films 51a and 51b exist incline to rise toward the electrode 21.

In this structure, the two ends of the electrode 21 are connected to the beams 22a and 22b. Since the beams 22a and 22b raise the electrode 21, the gap between the electrode 21 and a signal line 13 increases. This gap between the electrode 21 and signal line 13 can reduce the capacitance.

Second Example

Figure 23:
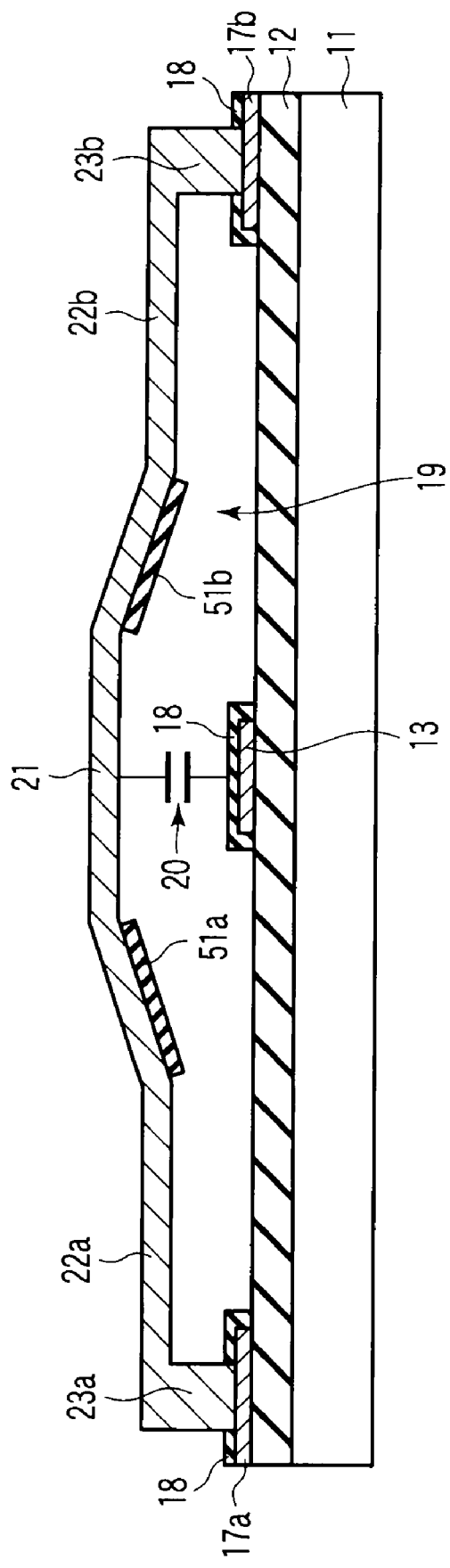
FIG. 23 is a sectional view taken along a line A-B-C-D-E-F in FIG. 22.

FIG. 22 is a top view of the electrostatic actuator according to the fourth embodiment. FIG. 23 is a sectional view taken along a line A-B-C-D-E-F in FIG. 22. The second example of the structure of the electrostatic actuator will be explained below.

As shown in FIGS. 22 and 23, the second example differs from the first example in that the thin films 51a and 51b are respectively formed on the lower surfaces of the beams 22a and 22b. The rest is the same as that of the first example, so a repetitive explanation will be omitted.

Note that it is also possible to form the thin films 51a and 51b on both the upper and lower surfaces of the inclined portions of the beams 22a and 22b, thereby sandwiching the inclined portions of the beams 22a and 22b between the thin films 51a and 51b, respectively.

[4-2] Bending of Beams

The beams 22a and 22b can be inclined by, e.g., the following two methods.

First Example

As shown in FIG. 19, thin films 51a and 51b having a tensile stress larger than that of a metal serving as the beams 22a and 22b are partially formed on the metal. In this manner, the beams 22a and 22b can be inclined so as to rise toward the electrode 21 from the substrate 11. When Al is used as the metal of the beams 22a and 22b, for example, Ti or the like having a tensile stress larger than that of Al can be used as the thin films 51a and 51b.

A method of manufacturing the structure of the first example is as follows. First, an insulating film 18 is formed on the upper surface and side surfaces of the signal line 13, and a sacrificial layer (not shown) is deposited on the insulating films 12 and 18. Then, the sacrificial layer is processed into the shape of a cavity portion 19. A metal material is deposited on this sacrificial layer and processed, thereby forming an electrode 21 and beams 22a and 22b. Subsequently, thin films 51a and 51b are deposited on the electrode 21 and beams 22a and 22b and processed. In this way, the thin films 51a and 51b are left behind on only the inclined portions of the beams 22a and 22b. After that, the sacrificial layer is removed.

Second Example

As shown in FIG. 23, thin films 51a and 51b having a compressive stress larger than that of a metal serving as the beams 22a and 22b are partially formed on the metal. In this manner, the beams 22a and 22b can be inclined so as to rise toward the electrode 21 from the substrate 11. When Al is used as the metal of the beams 22a and 22b, for example, SiN, $SiO_2$, or the like having a compressive stress larger than that of Al can be used as the thin films 51a and 51b.

A method of manufacturing the structure of the second example is as follows. First, an insulating film 18 is formed on the upper surface and side surfaces of the signal line 13, and a sacrificial layer (not shown) is deposited on the insulating films 12 and 18. Then, the sacrificial layer is processed into the shape of the cavity portion 19. Thin films 51a and 51b are deposited on this sacrificial layer and processed. Subsequently, a metal material is deposited on the sacrificial layer and thin films 51a and 51b and processed, thereby forming an electrode 21 and beams 22a and 22b. After that, the sacrificial layer is removed.

[4-3] Parasitic Capacitance

Figure 24A:
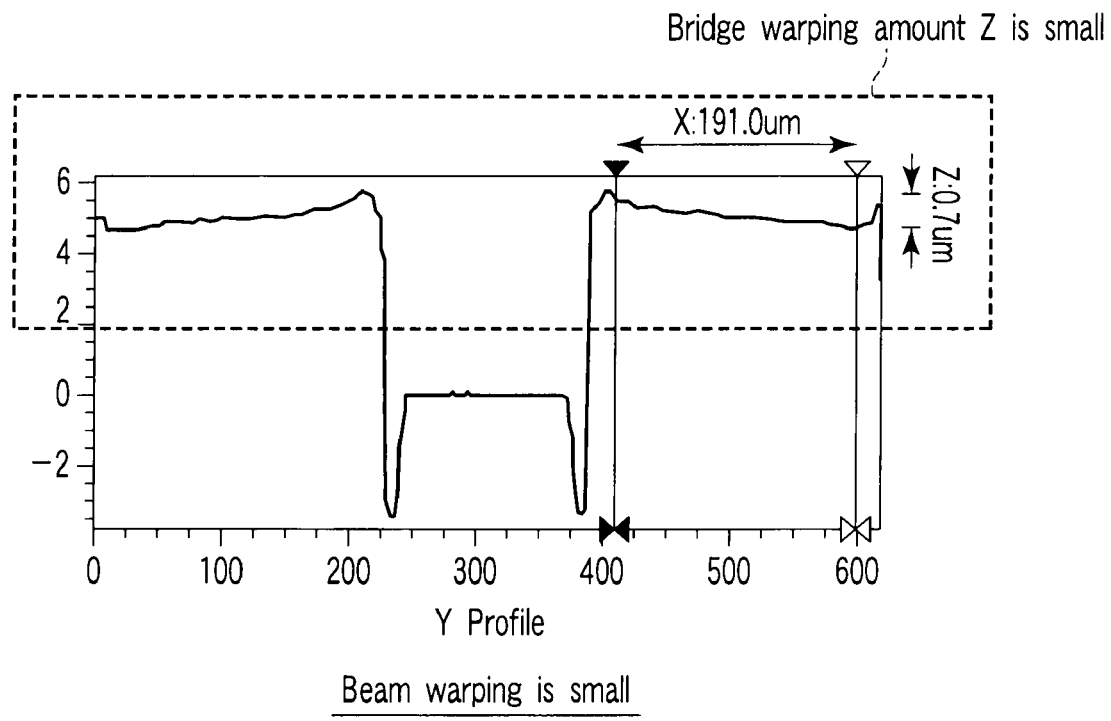
FIGS. 24A and 24B are views showing how the bridge warping amount changes in accordance with the difference between the warping amounts of a beam according to the fourth embodiment.
Figure 24B:
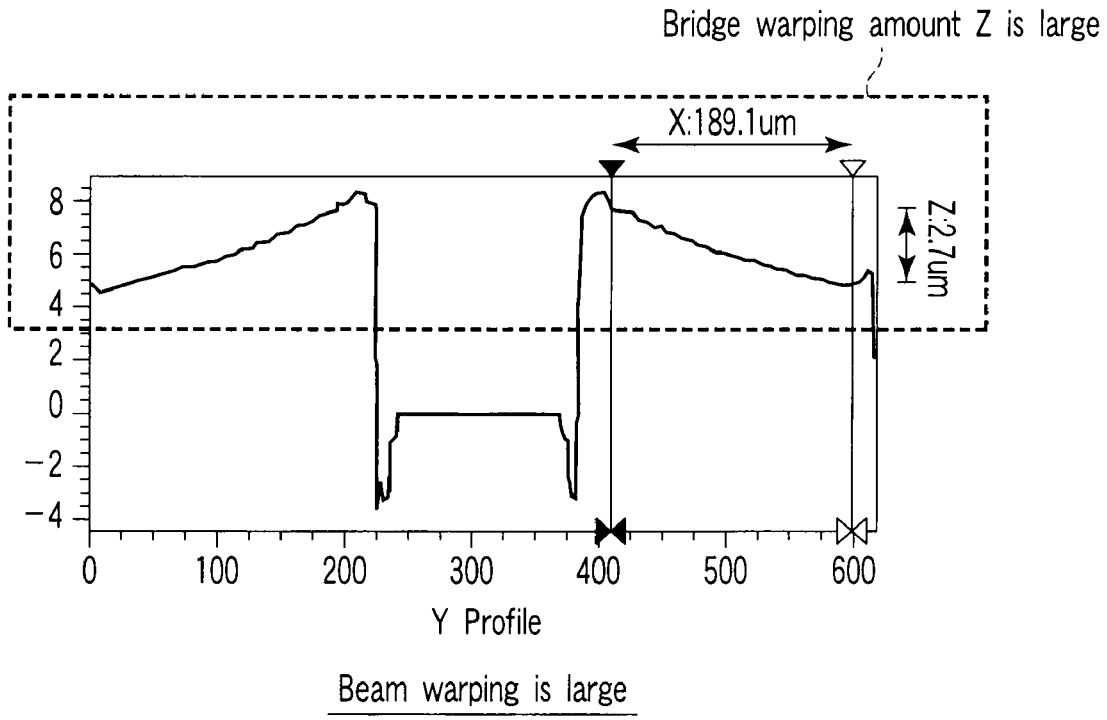
Figure 25:
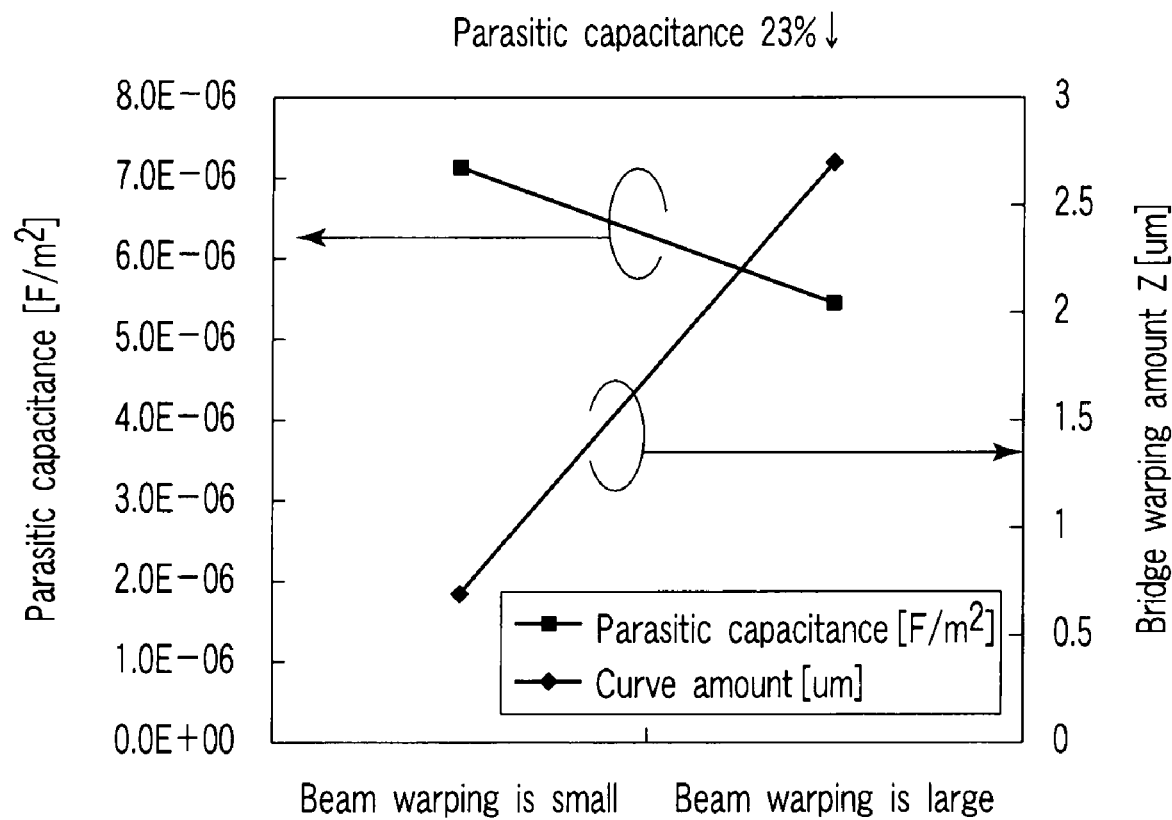
FIG. 25 is a graph showing the relationship between the beam warping amount and parasitic capacitance according to the fourth embodiment.

FIGS. 24A, 24B, and 25 show the measurement results of the parasitic capacitance of the structure having the inclined beams according to the fourth embodiment of the present invention. The parasitic capacitance reducing effect of the structure of this embodiment will be explained below.

As shown in FIGS. 24A, 24B, and 25, as the upward warping of the beams 22a and 22b increases, a bridge warping amount Z of the electrode 21 increases. This is so because the beams 22a and 22b connected to the two ends of the electrode 21 raise it. Also, as shown in FIG. 25, the parasitic capacitance reduces as the upward warping of the beams 22a and 22b increases. As a consequence, the parasitic capacitance can be reduced by 23% from that of the conventional structure.

Note that when the electrode 21 is raised, the upper electrodes 31a and 31b of the actuator portions 30a and 30b may also be raised to increase the driving voltage. However, the increase in driving voltage can be suppressed by giving the actuator portions 30a and 30b an electrode structure that inclines downward.

[4-4] Effects

The fourth embodiment described above can achieve the same effects as in the first embodiment. In addition, the fourth embodiment can achieve the following effects.

Generally, in a variable capacitor or switch for RF applications, the parasitic capacitance component in the OFF state is desirably small. The parasitic capacitance component of a variable capacitor or switch in the OFF state can be divided into a capacitance component coupled between the signal line 13 and substrate 11, and a capacitance component coupled by the gap of the air layer between the signal line 13 and electrode 21. The capacitance component between the signal line 13 and substrate 11 can be reduced by using a high-resistance Si substrate or glass substrate. On the other hand, the capacitance component obtained by the air layer between the signal line 13 and electrode 21 can be reduced by increasing the gap. This gap can be increased by depositing a thick sacrificial layer. As a consequence, the parasitic capacitance can be reduced. However, the gap between the actuator portions 30a and 30b also increases at the same time, and this may increase the driving voltage.

In the fourth embodiment, therefore, the thin films 51a and 51b are formed on portions of the beams 22a and 22b, and these portions of the beams 22a and 22b are inclined. Since this increases the gap between the signal line 13 and electrode 21, it is possible to reduce the capacitance component obtained by the air layer between the signal line 13 and electrode 21.

Furthermore, in the fourth embodiment, increasing the gap between the signal line 13 and electrode 21 also increases the gap between the actuators 30a and 30b. Since, however, the upper electrodes 31a and 31b are formed obliquely to the lower electrodes 14a and 14b, it is possible to increase the contact force obtained by the electrostatic attraction between the upper electrodes 31a and 31b and lower electrodes 14a and 14b. Consequently, the increase in driving voltage can be suppressed.

[5] Fifth Embodiment

The fifth embodiment is an example in which an electrostatic actuator is applied to a switch, unlike in the fourth embodiment. Note that differences from the fourth embodiment will be mainly explained in the fifth embodiment.

[5-1] Structure of Electrostatic Actuator

Figure 27:
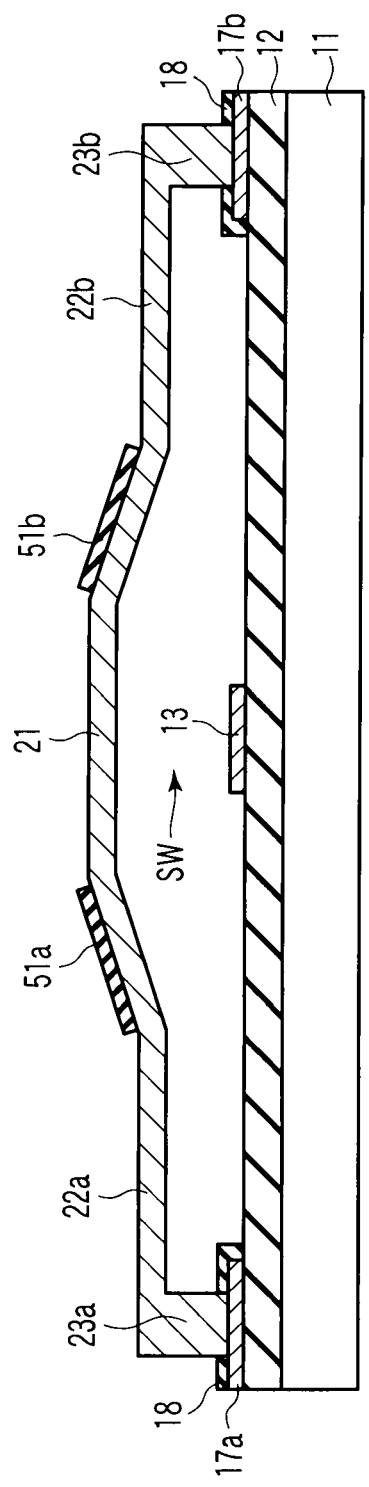
FIG. 27 is a sectional view taken along a line A-B-C-D-E-F in FIG. 26.
Figure 28:
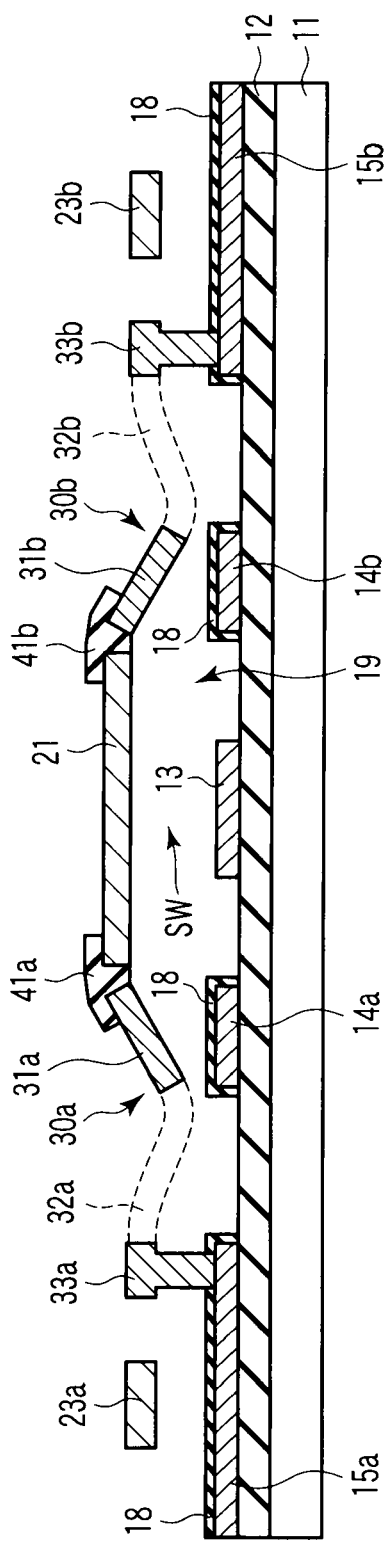
FIG. 28 is a sectional view taken along a line G-G' in FIG. 26.

FIG. 26 is a top view of the electrostatic actuator according to the fifth embodiment of the present invention. FIG. 27 is a sectional view taken along a line A-B-C-D-E-F in FIG. 26. FIG. 28 is a sectional view taken along a line G-G' in FIG. 26. FIG. 29 is a sectional view taken along a line H-H' in FIG. 26. The structure of the electrostatic actuator will be explained below.

As shown in FIGS. 26 to 29, the fifth embodiment differs from the fourth embodiment in that the insulating film 18 shown in FIG. 19 and the like is not formed on the surface of a signal line 13, and an electrode 21 and the signal line 13 function as a switch SW.

In this structure, an electric current flows when the electrode 21 goes down and comes in contact with the signal line 13, thereby implementing the resistive switch SW. The switch SW is turned on when the electrode 21 comes in contact with the signal line 13, and turned off when the electrode 21 moves away from the signal line 13.

[5-2] Effects

The fifth embodiment described above can achieve the same effects as in the fourth embodiment. In addition, as is also apparent from FIG. 5 described previously, the contact force of the electrode 21 is strong in this structure, so the contact resistance can be reduced, and the parasitic capacitance can also be reduced. Accordingly, the switch SW having little loss can be implemented.

Note that the actuator portions 30a and 30b in each of the above embodiments may also have a hybrid structure including, e.g., a piezo-electric actuator in addition to the electrostatic actuator.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrostatic actuator comprising:
a substrate;
a first lower electrode and a second lower electrode formed apart from each other above the substrate;
an electrode portion formed above the first lower electrode and the second lower electrode to have a cavity portion, including a first upper electrode, a second upper electrode, and a third upper electrode formed between the first upper electrode and the second upper electrode, the first upper electrode opposing the first lower electrode and having a first portion and a second portion, a first distance between the first upper electrode and the first lower electrode at the first portion being greater than a second distance between the first upper electrode and the first lower electrode at the second portion, the second upper electrode opposing the second lower electrode and having a third portion and a fourth portion, a third distance between the second upper electrode and the second lower electrode at the third portion being greater than a fourth distance between the second upper electrode and the second lower electrode at the fourth portion, a first boundary portion between the first upper electrode and the third upper electrode having a convex shape, a second boundary portion between the second upper electrode and the third upper electrode having a convex shape, and the electrode portion driving the third upper electrode by applying a potential difference between the first lower electrode and the first upper electrode and between the second lower electrode and the second upper electrode;
a first layer and a second layer formed in the first boundary portion and the second boundary portion, respectively; and
a third lower electrode formed above the substrate to oppose the third upper electrode, and
wherein a lower surface and an upper surface of the first upper electrode is exposed in a portion other than the first boundary portion, and a lower surface and an upper surface of the second upper electrode is exposed in a portion other than the second boundary portion, before the third upper electrode is driven, a fifth distance between the third upper electrode and the third lower electrode is equal to a sixth distance and a seventh distance, the sixth distance is a distance between the first upper electrode and the first lower electrode in a first end portion of the first upper electrode adjacent to the third upper electrode, and the seventh distance is a distance between the second upper electrode and the second lower electrode in a third end portion of the second upper electrode adjacent to the third upper electrode.

2. The actuator according to claim 1, wherein the first upper electrode and the third upper electrode are formed apart from each other and connected by the first layer, the second upper electrode and the third upper electrode are formed apart from each other and connected by the second layer, and the first layer and the second layer are each made of an insulating layer.

3. The actuator according to claim 1, wherein the first layer is connected to one side of the first upper electrode, the second layer is connected to one side of the second upper electrode, and a slit is formed in each of the first layer and the second layer along a direction substantially perpendicular to the one side.

4. The actuator according to claim 3, wherein each of the first layer and the second layer is separated into a plurality of islands by the slit.

5. The actuator according to claim 1, which further comprises:

a beam connected to the third upper electrode;

a first anchor connected to the beam;

a spring structure portion connected to one of the first upper electrode and the second upper electrode; and a second anchor connected to the spring structure portion, and in which a first spring constant from the third upper electrode to the first anchor is larger than a second spring constant from one of the first upper electrode and the second upper electrode to the second anchor.

6. The actuator according to claim 1, further comprising:

a beam connected to the third upper electrode; and a spring structure portion connected to one of the first upper electrode and the second upper electrode, and in which a width of a line forming the beam is greater than that of a line forming the spring structure portion.

7. The actuator according to claim 1, further comprising:

a beam connected to the third upper electrode; and a spring structure portion connected to one of the first upper electrode and the second upper electrode, and in which a planar shape of the spring structure portion is a meander shape.

8. The actuator according to claim 1, wherein the fifth distance between the third upper electrode and the third lower electrode is greater than the second distance and the fourth distance.

9. The actuator according to claim 1, which further comprises:

a first spring structure portion connected to the first upper electrode;

a second spring structure portion connected to the second upper electrode;

a first anchor connected to the first spring structure; and a second anchor connected to the second spring structure.

10. The actuator according to claim 9, wherein the second portion is located at a side of the first anchor, and the fourth portion is located at a side of the second anchor.

11. The actuator according to claim 1, wherein the sixth distance is greater than a distance between the first upper electrode and the first lower electrode in a second end portion of the first upper electrode away from the first end portion, and the seventh distance is greater than a distance between the second upper electrode and the second lower electrode in a fourth end portion of the second upper electrode away from the third end portion.

12. The actuator according to claim 11, wherein before the third upper electrode is driven, the second end portion of the first upper electrode is in contact with an end portion of the first lower electrode, and the fourth end portion of the second upper electrode is in contact with an end portion of the second lower electrode.

13. The actuator according to claim 11, wherein the fifth distance between the third upper electrode and the third lower electrode is greater than the second distance and the fourth distance.

14. The actuator according to claim 11 further comprising:

a first spring structure portion connected to the first upper electrode;

a second spring structure portion connected to the second upper electrode;

a first anchor connected to the first spring structure; and a second anchor connected to the second spring structure.

15. The actuator according to claim 1, which further comprises:

a third layer formed between the first upper electrode and the third upper electrode, below the first end portion of the first upper electrode, and below an end portion of the third upper electrode;

a fourth layer formed between the second upper electrode and the third upper electrode, below the third end portion of the second upper electrode, and below an end portion of the third upper electrode, and wherein the first upper electrode and the third upper electrode are spaced apart from each other, the second upper electrode and the third upper electrode are spaced apart from each other, the first layer is formed between the first upper electrode and the third upper electrode, on the first end portion of the first upper electrode, and on the end portion of the third upper electrode, the second layer is formed between the second upper electrode and the third upper electrode, on the third end portion of the second upper electrode, and on the end portion of the third upper electrode, the first layer, the second layer, the third layer and the fourth layer are made of an insulating layer.

16. The actuator according to claim 15, wherein stresses of the first layer and the third layer are controlled to form a first structure and a second structure each having a convex shape, stresses of the second layer and the fourth layer are controlled to form a third structure and a fourth structure each having a convex shape, the first structure is formed of the first layer, the first upper electrode and the third layer, the second structure is formed of the first layer, the third upper electrode and the third layer, the third structure is formed of the second layer, the second upper electrode and the fourth layer, and the fourth structure is formed of the second layer, the third upper electrode and the fourth layer.

17. The actuator according to claim 1, which further comprises:

an insulating film formed on the third lower electrode, and in which the third upper electrode and the third lower electrode form a variable capacitor.

18. The actuator according to claim 1, wherein the third upper electrode and the third lower electrode come in direct contact with each other and move away from each other, thereby functioning as a switch.

19. An electrostatic actuator comprising:

a substrate;

a first lower electrode and a second lower electrode formed apart from each other above the substrate;

an electrode portion formed above the first lower electrode and the second lower electrode to have a cavity portion, including a first upper electrode, a second upper electrode, and a third upper electrode formed between the first upper electrode and the second upper electrode, the first upper electrode opposing the first lower electrode and having a first portion and a second portion, a first distance between the first upper electrode and the first lower electrode at the first portion being greater than a second distance between the first upper electrode and the first lower electrode at the second portion, the second upper electrode opposing the second lower electrode and having a third portion and a fourth portion, a third distance between the second upper electrode and the second lower electrode at the third portion being greater than a fourth distance between the second upper electrode and the second lower electrode at the fourth portion, a first boundary portion between the first upper electrode and the third upper electrode having a convex shape, a second boundary portion between the second upper electrode and the third upper electrode having a convex shape, and the electrode portion driving the third upper electrode by applying a potential difference between the first lower electrode and the first upper electrode and between the second lower electrode and the second upper electrode; and a first layer and a second layer formed in the first boundary portion and the second boundary portion, respectively, wherein the first upper electrode and the third upper electrode are spaced apart from each other, the second upper electrode and the third upper electrode are spaced apart from each other, the first layer is formed between the first upper electrode and the third upper electrode, on an end portion of the first upper electrode, and on an end portion of the third upper electrode, and made of an insulating layer having a compressive stress larger than those of the first upper electrode and the third upper electrode, and the second layer is formed between the second upper electrode and the third upper electrode, on an end portion of the second upper electrode, and on an end portion of the third upper electrode, and made of an insulating layer having a compressive stress larger than those of the second upper electrode and the third upper electrode.

20. An electrostatic actuator comprising:

a substrate;

a first lower electrode and a second lower electrode formed apart from each other above the substrate;

an electrode portion formed above the first lower electrode and the second lower electrode to have a cavity portion, including a first upper electrode, a second upper electrode, and a third upper electrode formed between the first upper electrode and the second upper electrode, the first upper electrode opposing the first lower electrode and having a first portion and a second portion, a first distance between the first upper electrode and the first lower electrode at the first portion being greater than a second distance between the first upper electrode and the first lower electrode at the second portion, the second upper electrode opposing the second lower electrode and having a third portion and a fourth portion, a third distance between the second upper electrode and the second lower electrode at the third portion being greater than a fourth distance between the second upper electrode and the second lower electrode at the fourth portion, a first boundary portion between the first upper electrode and the third upper electrode having a convex shape, a second boundary portion between the second upper electrode and the third upper electrode having a convex shape, and the electrode portion driving the third upper electrode by applying a potential difference between the first lower electrode and the first upper electrode and between the second lower electrode and the second upper electrode; and a first layer and a second layer formed in the first boundary portion and the second boundary portion, respectively, wherein the first upper electrode and the third upper electrode are spaced apart from each other, the second upper electrode and the third upper electrode are spaced apart from each other, the first layer is formed between the first upper electrode and the third upper electrode, below an end portion of the first upper electrode, and below an end portion of the third upper electrode, and made of an insulating layer having a tensile stress larger than those of the first upper electrode and the third upper electrode, and the second layer is formed between the second upper electrode and the third upper electrode, below an end portion of the second upper electrode, and below an end portion of the third upper electrode, and made of an insulating layer having a tensile stress larger than those of the second upper electrode and the third upper electrode.

* * * * *